(12) United States Patent
Kim et al.

(10) Patent No.: US 12,345,510 B2
(45) Date of Patent: Jul. 1, 2025

(54) ECO-FRIENDLY SMART INDOOR LIVE AMMUNITION SHOOTING RANGE SYSTEM

(71) Applicant: EA-GAIA INC., Chuncheon-si (KR)

(72) Inventors: Hee Joung Kim, Chuncheon-si (KR); Min A Gang, Chuncheon-si (KR); Sun Gu Kim, Chuncheon-si (KR); Sun Jae Kim, Chuncheon-si (KR)

(73) Assignee: EA-GAIA INC., Chuncheon-si (KR)

( * ) Notice: Subject to any disclaimer, the term of this patent is extended or adjusted under 35 U.S.C. 154(b) by 690 days.

(21) Appl. No.: 17/782,927

(22) PCT Filed: Dec. 17, 2020

(86) PCT No.: PCT/KR2020/018513
§ 371 (c)(1),
(2) Date: Jun. 6, 2022

(87) PCT Pub. No.: WO2021/125818
PCT Pub. Date: Jun. 24, 2021

(65) Prior Publication Data
US 2023/0003493 A1    Jan. 5, 2023

(30) Foreign Application Priority Data

Dec. 18, 2019 (KR) .................. 10-2019-0169636
Mar. 10, 2020 (KR) .................. 10-2020-0029553
(Continued)

(51) Int. Cl.
F41J 13/00    (2009.01)
F24F 7/003    (2021.01)
(Continued)

(52) U.S. Cl.
CPC .............. *F41J 13/00* (2013.01); *F24F 7/003* (2021.01); *F24F 7/08* (2013.01); *F24F 11/77* (2018.01);
(Continued)

(58) Field of Classification Search
None
See application file for complete search history.

(56) References Cited

U.S. PATENT DOCUMENTS 4,164,901 A * 8/1979 Everett .................... F41J 11/00
55/318
4,598,631 A * 7/1986 Everett .................... F41J 11/00
454/251

(Continued)

FOREIGN PATENT DOCUMENTS

JP           4300974 B2     7/2009
KR      10-0927222 B1     11/2009
KR      10-2009459 B1      8/2019

*Primary Examiner* — Sunit Pandya
(74) *Attorney, Agent, or Firm* — You & IP, LLC

(57) ABSTRACT

An indoor live ammunition shooting range facility system includes a ventilation facility installed in an indoor live ammunition shooting range, and configured to ventilate air of the indoor live ammunition shooting range; a targeting device facility installed in the indoor live ammunition shooting range, and configured to provide a shooting target; a bulletproof facility installed to protect components exposed to an inside of the indoor live ammunition shooting range among components configuring the ventilation facility and the target device facility and to protect a wall surface of the indoor live ammunition shooting range; a bullet head recovery facility installed on a side opposite to a shooting position, and configured to recover a bullet head; and a control facility installed in the indoor live ammunition shooting range, and configured to control the ventilation facility, the target device facility and the bullet head recovery facility.

13 Claims, 16 Drawing Sheets

(30) Foreign Application Priority Data

Mar. 12, 2020 (KR) .......................... 10-2020-0030955
Dec. 17, 2020 (KR) .......................... 10-2020-0177005

(51) Int. Cl.
  *F24F 7/08* (2006.01)
  *F24F 11/77* (2018.01)
  *F24F 13/06* (2006.01)
  *F24F 13/28* (2006.01)
  *F41J 5/14* (2006.01)
  *F41J 7/00* (2006.01)
  *F24F 110/65* (2018.01)

(52) U.S. Cl.
  CPC .............. *F24F 13/06* (2013.01); *F24F 13/28* (2013.01); *F41J 5/14* (2013.01); *F41J 7/00* (2013.01); *F24F 2110/65* (2018.01); *F24F 2221/14* (2013.01)

(56) References Cited

U.S. PATENT DOCUMENTS

| | | | | |
|---|---|---|---|---|
| 5,902,182 | A | * | 5/1999 | Kramer .................. B01D 53/04 55/467 |
| 6,530,572 | B1 | | 3/2003 | Overley |
| 2007/0102883 | A1 | | 5/2007 | Parks et al. |

* cited by examiner

ECO-FRIENDLY SMART INDOOR LIVE AMMUNITION SHOOTING RANGE SYSTEM

TECHNICAL FIELD

Various embodiments generally relate to an eco-friendly smart indoor live ammunition shooting range facility system, and more particularly, to an eco-friendly smart indoor live ammunition shooting range facility system capable of quickly and reliably discharging a harmful substance containing a heavy metal, such as lead (lead fume) and copper, generated due to live ammunition shooting, realizing various shooting training situations by providing a smart target different from an existing simple fixed type target, and forming an eco-friendly live ammunition shooting range by recovering an original bullet head as it is in a beaten zone.

BACKGROUND ART

Due to the nature of their works, military units or police stations that handle firearms such as rifles and pistols have been continuously conducting shooting training for these individual firearms in order to cultivate shooting ability required in case of emergency and maintain combat power.

Shooting training using these individual firearms is mainly conducted at indoor or outdoor zero point shooting ranges and real shooting ranges. Since there is a problem in that heavy metals contained in bullet heads fired at such live ammunition shooting ranges seriously pollute the surrounding environment, there exist considerable difficulties in disposing of the bullet heads. In other words, a bullet head fired from a firearm collides with the iron plate of a shooting range to generate lead fume and dust, and as the fine powders thereof are scattered into the air, there arises a problem in that air pollution occurs severely.

Actually, in an indoor live ammunition shooting range operated by the military, bullet heads fired from firearms such as pistols and rifles collide with the iron plate of a beaten zone or walls and facilities near the beaten zone to generate loud noise and dust. In particular, there arise various problems such as polluting the indoor air as heavy metal components scatter from the bullet heads crushed due to the collision.

In the case of an indoor shooting range, waste tires or tire chips are placed behind a target to absorb the impact of bullet heads. However, since heavy metal components such as lead and cadmium contained in the waste tires are scattered as dust into the air due to collision with the bullet heads, there is caused a disadvantage of further increasing indoor air pollution, and as a result, it came to the point that the operation of indoor live ammunition shooting ranges for military units and police stations is stopped.

In addition, as such, as, in the indoor shooting range, the bullet heads of live ammunitions hit the iron plate of the beaten zone or a surrounding concrete barrier or facility and are broken and scattered, a problem is caused in that heavy metal components such as lead contained in the bullet heads are accumulated in the air and soil as they are, thereby polluting the qualities of the air, soil and water. According to a recent investigation, there is a case where lead component has been detected up to 1200 times a standard value in the soil near a live ammunition shooting range of a military unit.

In particular, there is a problem in that exhaust gas generated from a barrel at a shooting lane where a shooter is positioned directly exerts an influence on the shooter.

Accordingly, in order to solve the above problems and quickly normalize the operation of indoor shooting ranges installed in military units and police training centers, it should be possible to prevent the pollution of air by heavy metals due to shooting of live ammunitions.

In the meantime, a conventional live ammunition shooting range has a disadvantage in that an operation of replacing a target is cumbersome because a shooting target device should replace the target every time a shooting trainee is changed.

Furthermore, in the conventional art, in a process in which a shooting trainee performs shooting, in the case of long-distance shooting, it is difficult to clearly check with the naked eye which part of a target is penetrated by a fired bullet head. Therefore, a problem is caused in that the quality of actual shooting training is greatly reduced because measures such as correcting a shooting posture or correcting the gunsight of a gun cannot be taken during shooting even when, for example, a bullet head greatly deviates from a target or does not hit an intended part of a target.

DISCLOSURE

Technical Problem

Various embodiments are directed to an eco-friendly smart indoor live ammunition shooting range facility system capable of quickly and reliably discharging a harmful substance containing a heavy metal, such as lead (lead fume) and copper, generated due to live ammunition shooting, realizing various shooting training situations by providing a smart target different from an existing simple fixed type target, and forming an eco-friendly live ammunition shooting range by recovering an original bullet head as it is in a beaten zone.

Objectives to be achieved by the present disclosure are not limited to those described above, and other objectives which are not described above may be clearly understood by those skilled in the art through the following description.

Technical Solution

In an embodiment, an indoor live ammunition shooting range facility system may include: a ventilation facility installed in an indoor live ammunition shooting range, and configured to ventilate air of the indoor live ammunition shooting range; a targeting device facility installed in the indoor live ammunition shooting range, and configured to provide a shooting target; a bulletproof facility installed to protect components exposed to an inside of the indoor live ammunition shooting range among components configuring the ventilation facility and the target device facility and to protect a wall surface of the indoor live ammunition shooting range; a bullet head recovery facility installed on a side opposite to a shooting position, and configured to recover a bullet head; and a control facility installed in the indoor live ammunition shooting range, and configured to control the ventilation facility, the target device facility and the bullet head recovery facility.

Advantageous Effects

The eco-friendly smart indoor live ammunition shooting range facility system according to the present disclosure provides the following effects.

First, the present disclosure provides an effect that a harmful substance containing a heavy metal, such as lead (lead fume) and copper, generated in a live ammunition shooting range due to the use of a live ammunition may be efficiently and reliably discharged in conformity with the environment according to the live ammunition shooting range.

Second, the present disclosure provides an effect that it is possible to prevent a harmful substance containing a heavy metal from spreading into air not only on a target side where a bullet head hits and on a shooting lane side where a shooter is positioned but also throughout the inside of a shooting range, thereby preventing adverse influences from being exerted on the health of the shooter or a manager.

Third, the present disclosure provides an effect that it is possible to more reliably prevent an influence from being exerted on a shooter who is most affected by the barrel exhaust gas generated due to shooting of a live ammunition, thereby making the health of the shooter safer, and that it is possible to create comfortable shooting range environment, thereby increasing the efficiency of a shooting training.

Fourth, the present disclosure provides an effect that a target does not need to be replaced every time after shooting and can be used for a long time, thereby improving shooting operability and preventing the occurrence of an accident.

Fifth, the present disclosure provides an effect that a target object such as a long-distance target, a short-distance target and a target type may be easily changed and a training situation for night shooting may be easily created.

Sixth, the present disclosure provides an effect that an influence exerted by a harmful substance containing a heavy metal generated in a shooting range due to the use of a live ammunition may be minimized and an original bullet head or a bullet head close to the original bullet head may be easily recovered, thereby ensuring recycling and preventing environmental pollution.

Effects of the present disclosure are not limited to those described above, and other effects which are not described above may be clearly understood by those skilled in the art through the following description.

MODE FOR DISCLOSURE

Figure 1:
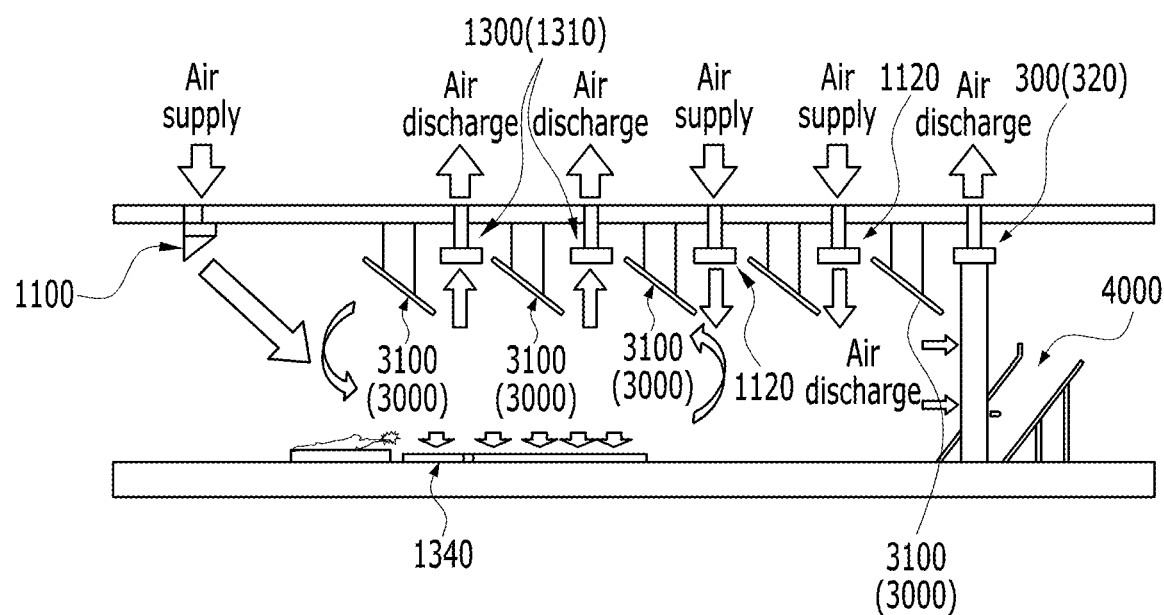
FIG. 1 is a view schematically illustrating the configuration of a ventilation facility included in an eco-friendly smart indoor live ammunition shooting range facility system in accordance with the present disclosure.

Further objects, features and advantages of the present disclosure can be more clearly understood from the following detailed description and the accompanying drawings.

Prior to the detailed description of the present disclosure, the present disclosure may be variously modified and may have various embodiments, and the examples described below and illustrated in the drawings are not intended to limit the present disclosure to specific embodiments. It is to be understood that the present disclosure includes all modifications, equivalents, and substitutes included in the spirit and technical scope of the present disclosure.

It will be understood that, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In addition, in the description with reference to the accompanying drawings, the same components will be given the same reference numerals and duplicate description thereof will be omitted. In the following description of the present disclosure, when it is determined that the detailed description of the related known technology may unnecessarily obscure the subject matter of the present disclosure, the detailed description thereof will be omitted.

Hereinafter, an eco-friendly smart indoor live ammunition shooting range system according to an embodiment of the present disclosure will be described in detail with reference to the accompanying drawings.

Figure 2:
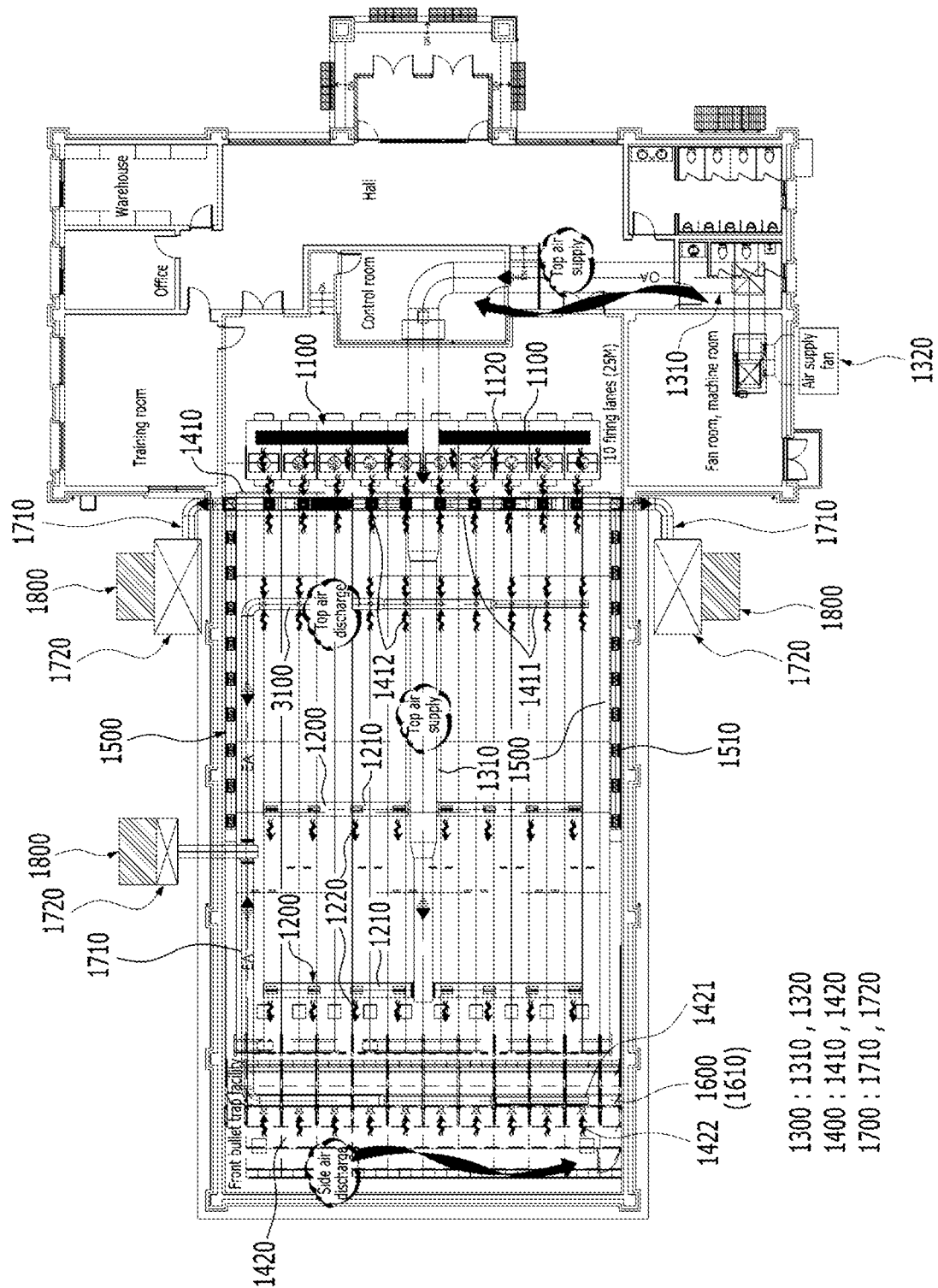
FIG. 2 is a plan view illustrating the ventilation facility included in the eco-friendly smart indoor live ammunition shooting range facility system in accordance with the present disclosure.
Figure 3:
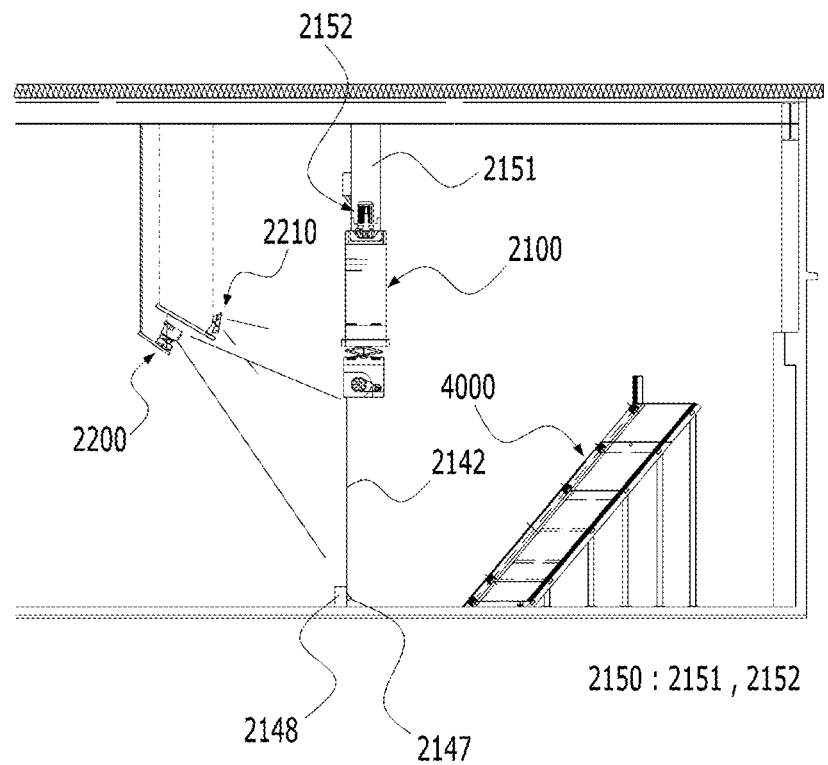
FIG. 3 is a view schematically illustrating an example in which a target device facility of a first embodiment included in the eco-friendly smart indoor live ammunition shooting range facility system in accordance with the present disclosure are installed in an indoor live ammunition shooting range.
Figure 4:
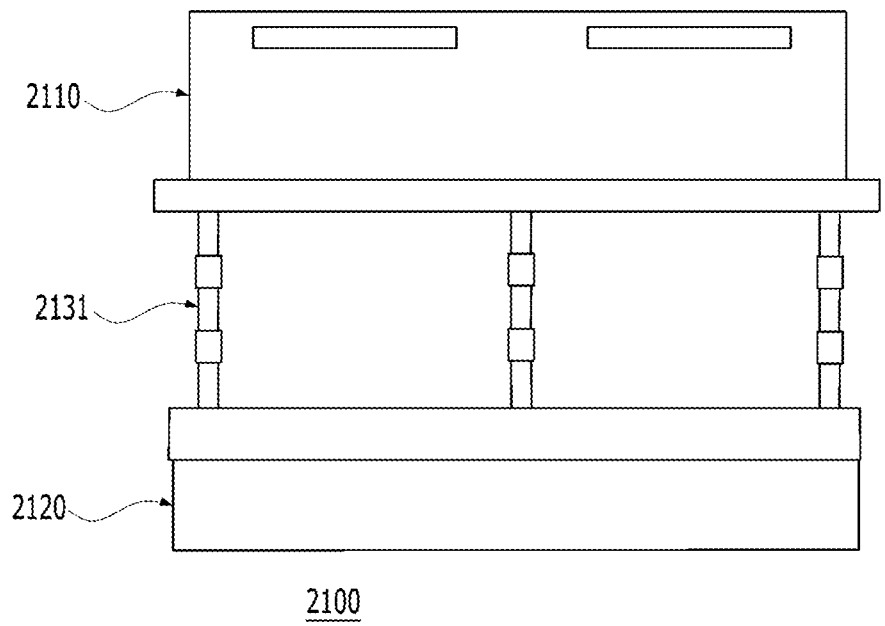
FIG. 4 is a front view illustrating the target device facility of the first embodiment included in the eco-friendly smart indoor live ammunition shooting range facility system in accordance with the present disclosure.
Figure 5:
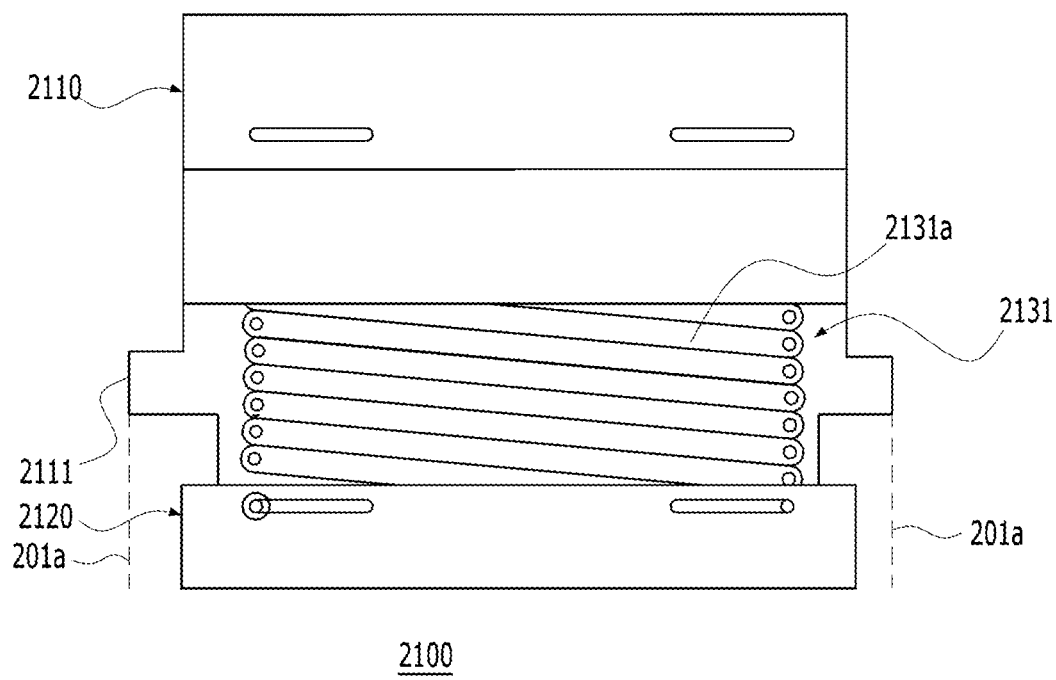
FIG. 5 is a side view of the target device facility of the first embodiment included in the eco-friendly smart indoor live ammunition shooting range facility system in accordance with the present disclosure, illustrating a state in which an X-shaped foldable link member is contracted by being folded.
Figure 6:
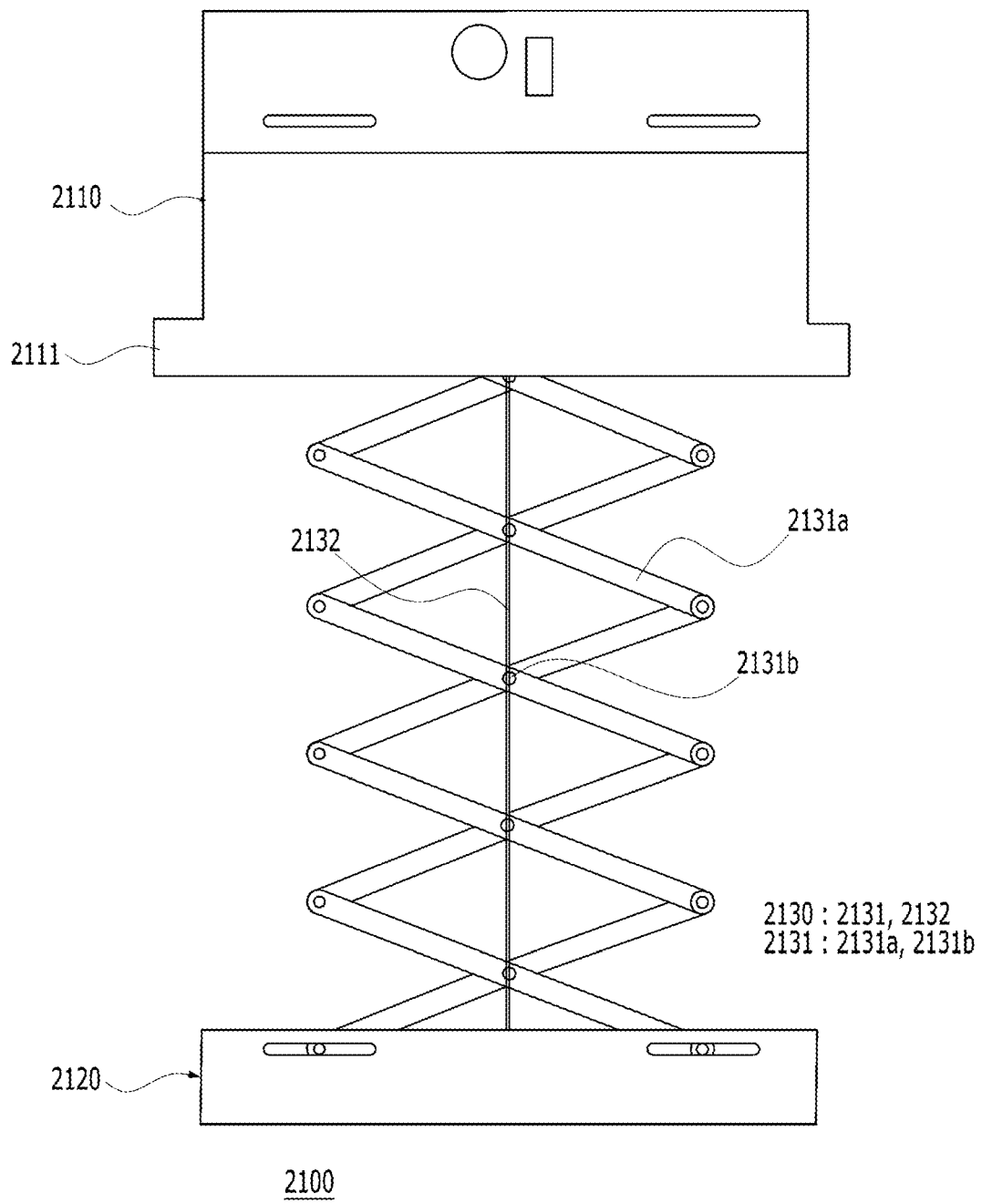
FIG. 6 is a side view of the target device facility of the first embodiment included in the eco-friendly smart indoor live ammunition shooting range facility system in accordance with the present disclosure, illustrating a state in which the X-shaped foldable link member is stretched by being unfolded.
Figure 7:
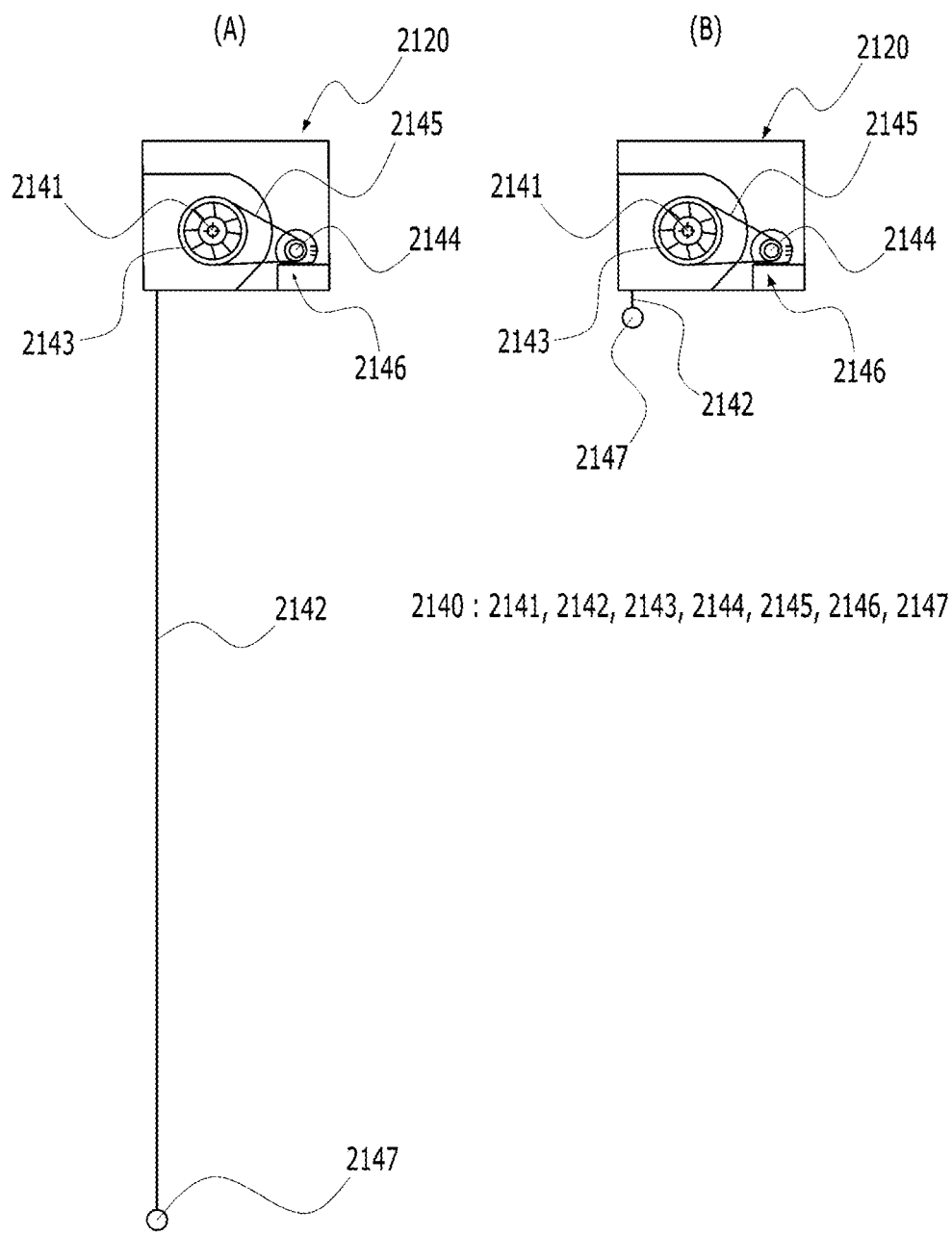
FIG. 7 is views illustrating states in which a roll screen member constituting the target device facility of the first embodiment included in the eco-friendly smart indoor live ammunition shooting range facility system in accordance with the present disclosure is drawn in and out, wherein (A) illustrates a drawn-out state of the roll screen member and (B) illustrates a drawn-in state of the roll screen member.
Figure 8:
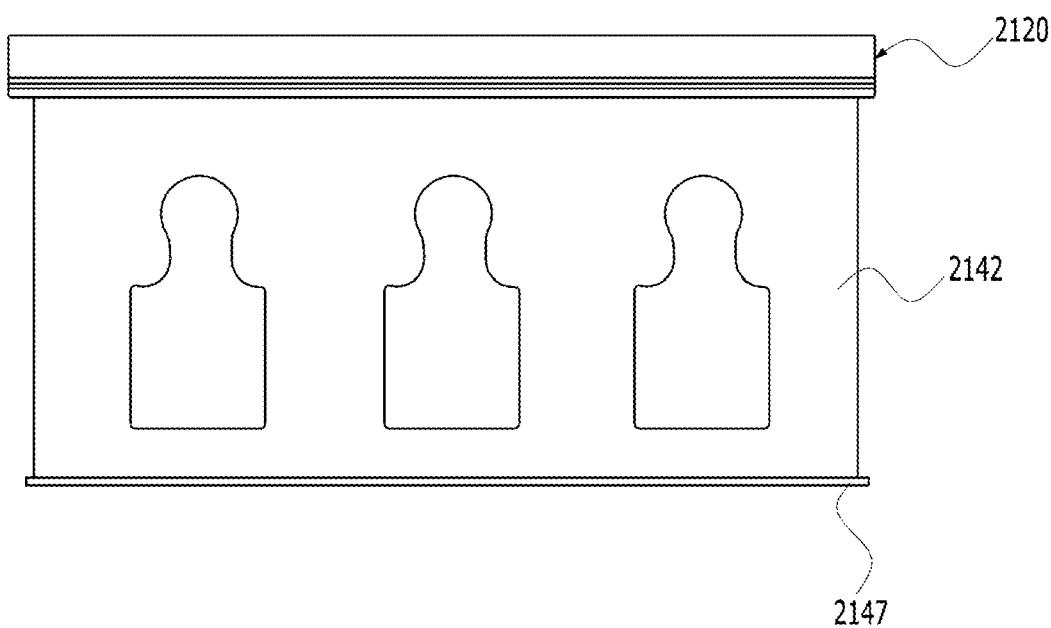
FIG. 8 is a front view illustrating a state in which the roll screen member constituting the target device facility of the first embodiment included in the eco-friendly smart indoor live ammunition shooting range facility system in accordance with the present disclosure is drawn out.
Figure 9:
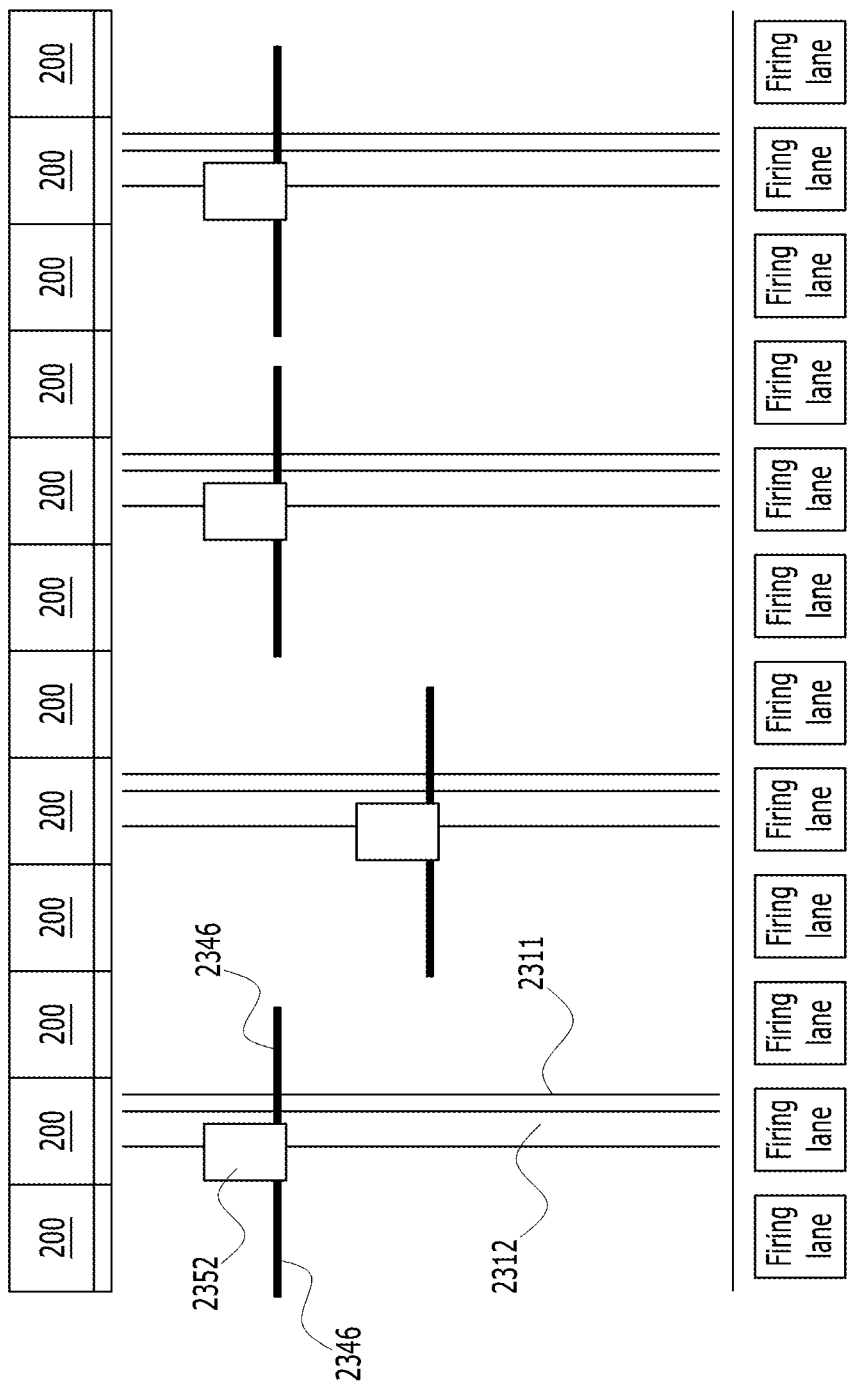
FIG. 9 is a bottom view illustrating a target device facility of a second embodiment included in the eco-friendly smart indoor live ammunition shooting range facility system in accordance with the present disclosure.
Figure 10:
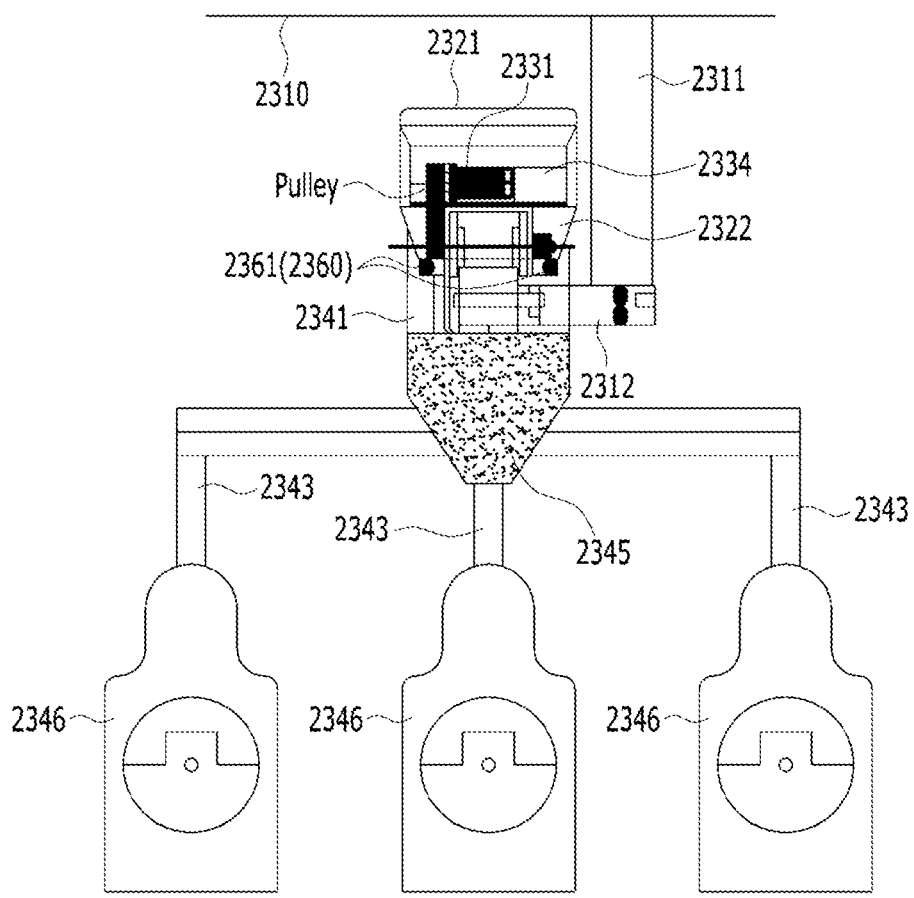
FIG. 10 is a front view illustrating the target device facility of the second embodiment included in the eco-friendly smart indoor live ammunition shooting range facility system in accordance with the present disclosure.
Figure 11:
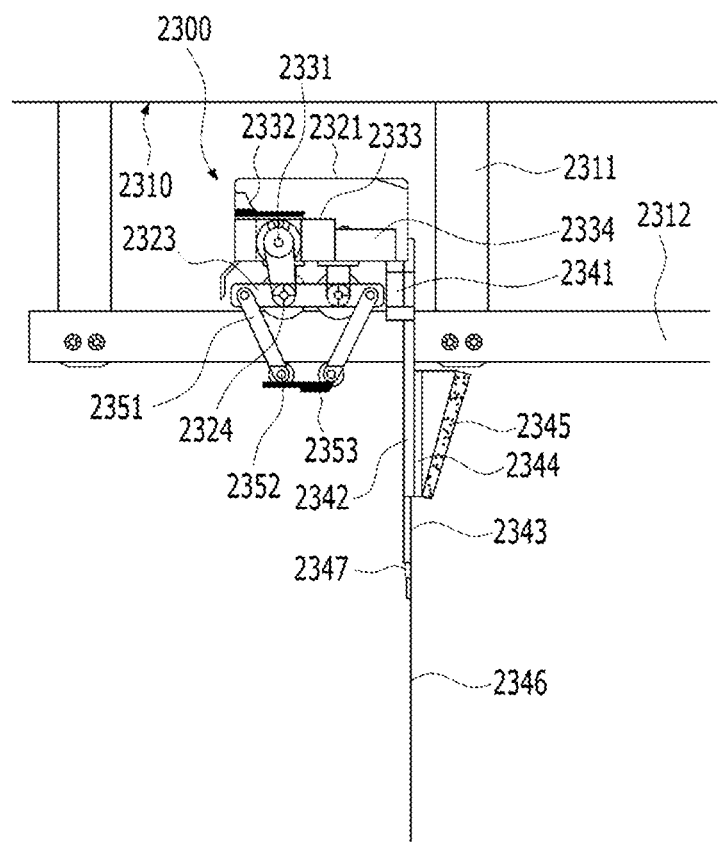
FIG. 11 is a side view illustrating the target device facility of the second embodiment included in the eco-friendly smart indoor live ammunition shooting range facility system in accordance with the present disclosure.
Figure 12:
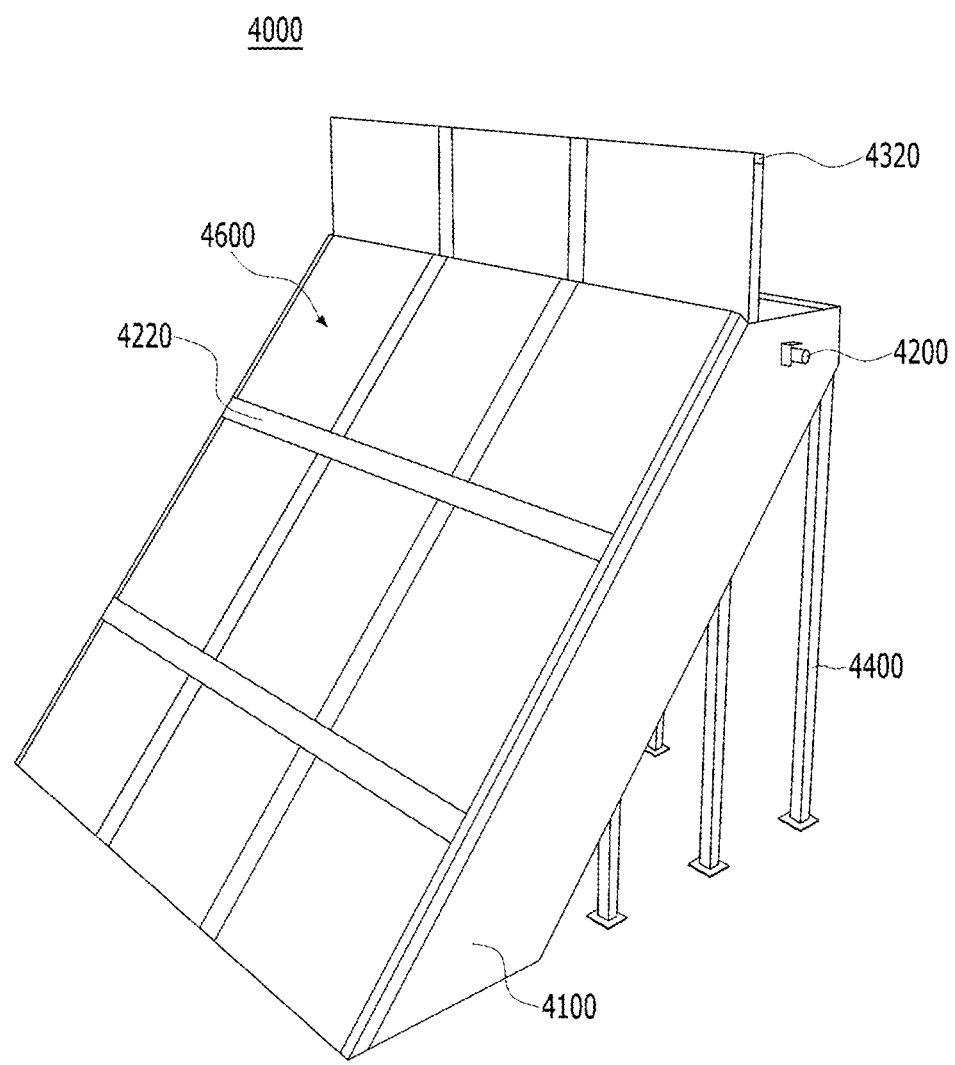
FIG. 12 is a front perspective view illustrating a bullet head recovery facility included in the eco-friendly smart indoor live ammunition shooting range facility system in accordance with the present disclosure.
Figure 13:
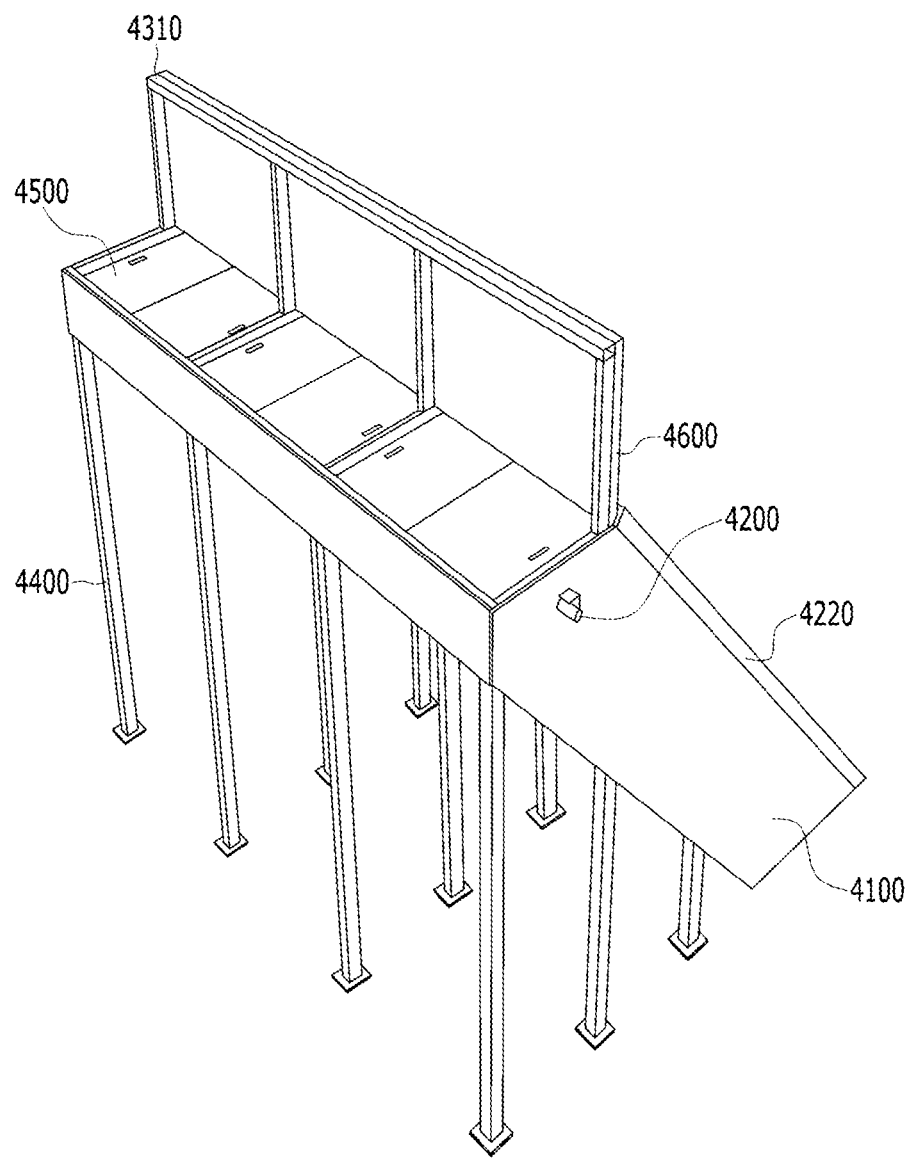
FIG. 13 is a rear perspective view illustrating the bullet head recovery facility included in the eco-friendly smart indoor live ammunition shooting range facility system in accordance with the present disclosure.
Figure 14:
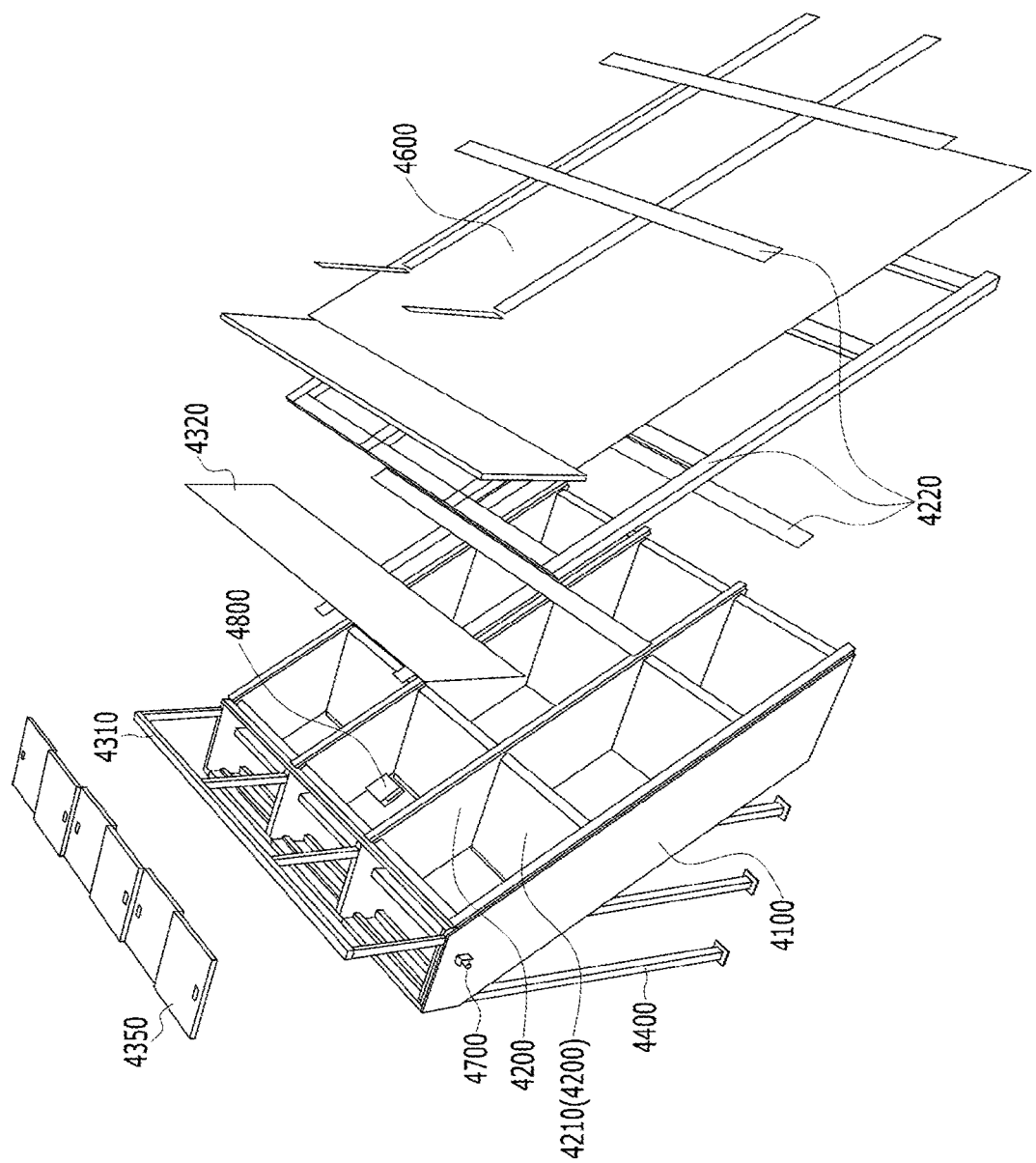
FIG. 14 is an exploded perspective view illustrating the bullet head recovery facility included in the eco-friendly smart indoor live ammunition shooting range facility system in accordance with the present disclosure.
Figure 15:
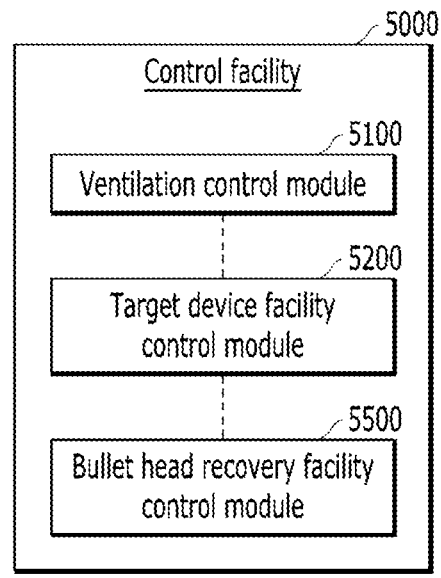
FIG. 15 is a block diagram schematically illustrating the configuration of a control facility included in the eco-friendly smart indoor live ammunition shooting range facility system in accordance with the present disclosure.
Figure 16:
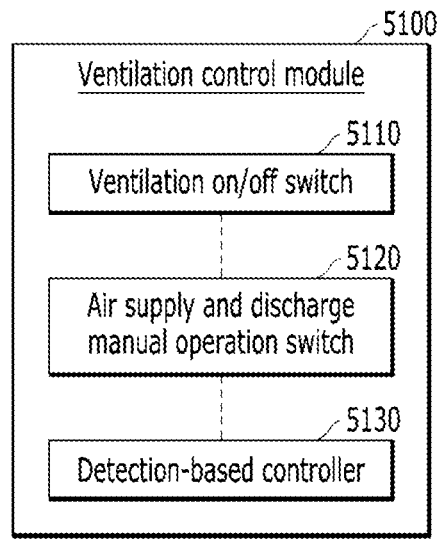
FIG. 16 is a block diagram schematically illustrating the configuration of a ventilation control module of the control facility included in the eco-friendly smart indoor live ammunition shooting range facility system in accordance with the present disclosure.
Figure 17:
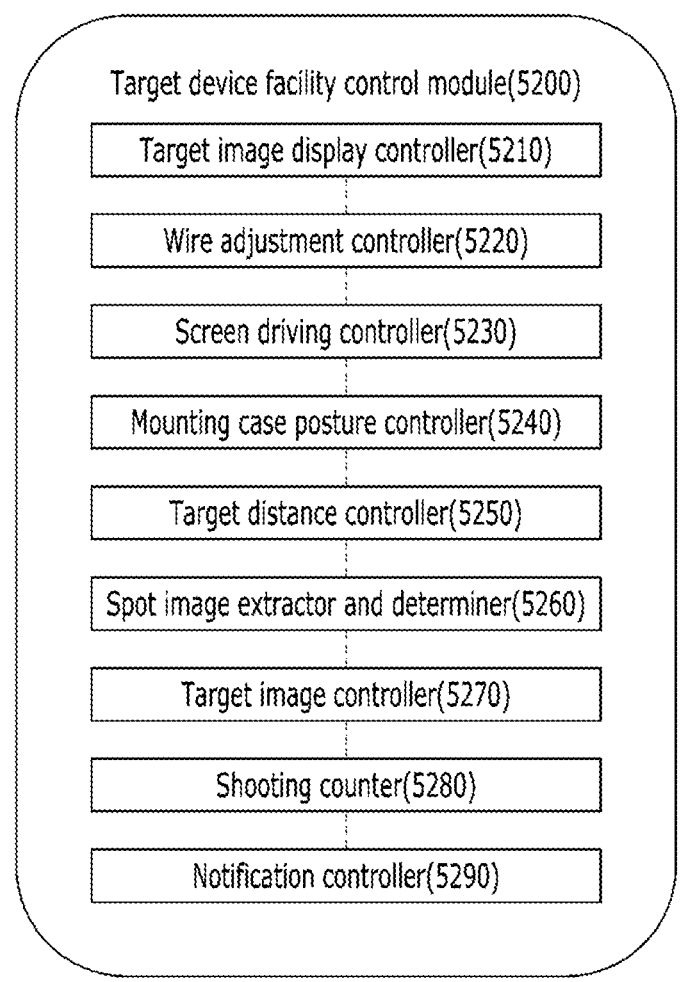
FIG. 17 is a block diagram schematically illustrating the configuration of a target device facility control module of a first embodiment of the control facility included in the eco-friendly smart indoor live ammunition shooting range facility system in accordance with the present disclosure.
Figure 18:
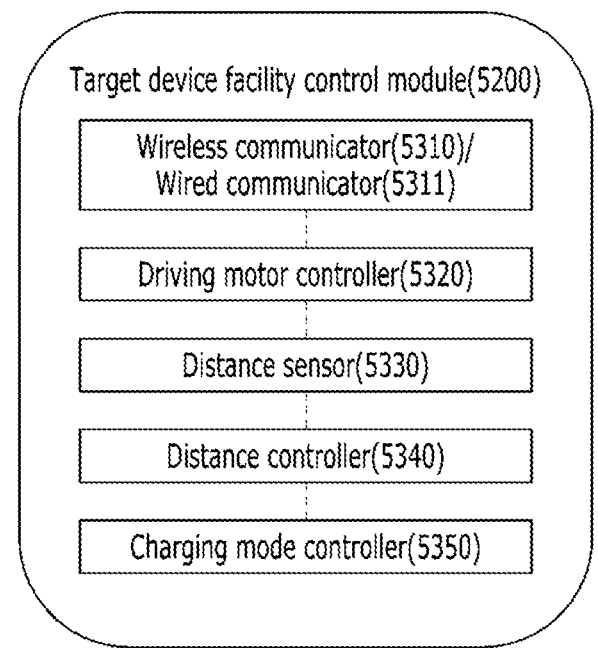
FIG. 18 is a block diagram schematically illustrating the configuration of a target device facility control module of a second embodiment of the control facility included in the eco-friendly smart indoor live ammunition shooting range facility system in accordance with the present disclosure.
Figure 19:
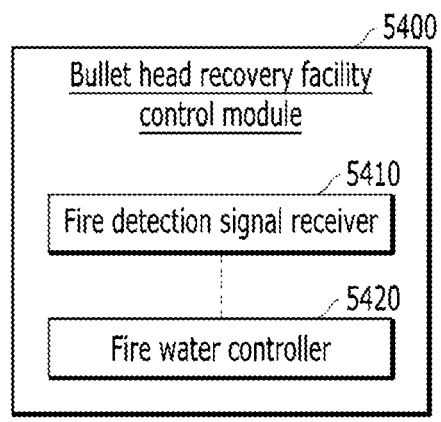
FIG. 19 is a block diagram schematically illustrating the configuration of a bullet head recovery facility control module of the control facility included in the eco-friendly smart indoor live ammunition shooting range facility system in accordance with the present disclosure.

FIG. 1 is a view schematically illustrating the configuration of a ventilation facility included in an eco-friendly smart indoor live ammunition shooting range facility system in accordance with the present disclosure, and FIG. 2 is a plan view illustrating the ventilation facility included in the eco-friendly smart indoor live ammunition shooting range facility system in accordance with the present disclosure. FIG. 3 is a view schematically illustrating an example in which a target device facility of a first embodiment included in the eco-friendly smart indoor live ammunition shooting range facility system in accordance with the present disclosure are installed in an indoor live ammunition shooting range, FIG. 4 is a front view illustrating the target device facility of the first embodiment included in the eco-friendly smart indoor live ammunition shooting range facility system in accordance with the present disclosure, and FIG. 5 is a side view of the target device facility of the first embodiment included in the eco-friendly smart indoor live ammunition shooting range facility system in accordance with the present disclosure, illustrating a state in which an X-shaped foldable link member is contracted by being folded. FIG. 6 is a side view of the target device facility of the first embodiment included in the eco-friendly smart indoor live ammunition shooting range facility system in accordance with the present disclosure, illustrating a state in which the X-shaped foldable link member is stretched by being unfolded, FIG. 7 is views illustrating states in which a roll screen member constituting the target device facility of the first embodiment included in the eco-friendly smart indoor live ammunition shooting range facility system in accordance with the present disclosure is drawn in and out, wherein (A) illustrates a drawn-out state of the roll screen member and (B) illustrates a drawn-in state of the roll screen member, and FIG. 8 is a front view illustrating a state in which the roll screen member constituting the target device facility of the first embodiment included in the eco-friendly smart indoor live ammunition shooting range facility system in accordance with the present disclosure is drawn out. FIG. 9 is a bottom view illustrating a target device facility of a second embodiment included in the eco-friendly smart indoor live ammunition shooting range facility system in accordance with the present disclosure, FIG. 10 is a front view illustrating the target device facility of the second embodiment included in the eco-friendly smart indoor live ammunition shooting range facility system in accordance with the present disclosure, and FIG. 11 is a side view illustrating the target device facility of the second embodiment included in the eco-friendly smart indoor live ammunition shooting range facility system in accordance with the present disclosure. FIG. 12 is a front perspective view illustrating a bullet head recovery facility included in the eco-friendly smart indoor live ammunition shooting range facility system in accordance with the present disclosure, FIG. 13 is a rear perspective view illustrating the bullet head recovery facility included in the eco-friendly smart indoor live ammunition shooting range facility system in accordance with the present disclosure, and FIG. 14 is an exploded perspective view illustrating the bullet head recovery facility included in the eco-friendly smart indoor live ammunition shooting range facility system in accordance with the present disclosure. FIG. 15 is a block diagram schematically illustrating the configuration of a control facility included in the eco-friendly smart indoor live ammunition shooting range facility system in accordance with the present disclosure, FIG. 16 is a block diagram schematically illustrating the configuration of a ventilation control module of the control facility included in the eco-friendly smart indoor live ammunition shooting range facility system in accordance with the present disclosure, FIG. 17 is a block diagram schematically illustrating the configuration of a target device facility control module of a first embodiment of the control facility included in the eco-friendly smart indoor live ammunition shooting range facility system in accordance with the present disclosure, FIG. 18 is a block diagram schematically illustrating the configuration of a target device facility control module of a second embodiment of the control facility included in the eco-friendly smart indoor live ammunition shooting range facility system in accordance with the present disclosure, and FIG. 19 is a block diagram schematically illustrating the configuration of a bullet head recovery facility control module of the control facility included in the eco-friendly smart indoor live ammunition shooting range facility system in accordance with the present disclosure.

The eco-friendly smart indoor live ammunition shooting range facility system in accordance with the present disclosure is an indoor live ammunition shooting range facility system installed in an indoor live ammunition shooting range, and as illustrated in FIGS. 1 to 19, generally includes a ventilation facility 1000; a target device facility 2000; a bulletproof facility 3000; a bullet head recovery facility 4000; and a control facility 5000.

In detail, the eco-friendly smart indoor live ammunition shooting range facility system in accordance with the present disclosure is an indoor live ammunition shooting range facility system installed in an indoor live ammunition shooting range, and as illustrated in FIGS. 1 to 19, includes the ventilation facility 1000 installed in an indoor live ammunition shooting range and configured to ventilate the air of the live ammunition shooting range; the targeting device facility 2000 installed in the indoor live ammunition shooting range and configured to provide a shooting target; the bulletproof facility 3000 installed to protect components exposed to a bullet head among components constituting the ventilation facility 1000 and the target device facility 2000 and to protect the wall surface of the indoor shooting range; the bullet head recovery facility 4000 installed on a side opposite to a shooting position (or a side behind the target of the target device facility 2000) and configured to recover a bullet head; and the control facility 5000 installed in the indoor shooting range and configured to control the ventilation facility 1000, the target device facility 2000 and the bullet head recovery facility 4000.

The respective facilities included in the eco-friendly smart indoor live ammunition shooting range facility system in accordance with the present disclosure will be described below in detail.

Ventilation Facility 1000

As illustrated in FIGS. 1 and 2, the ventilation facility 1000 generally includes a plurality of ceiling air supply units 1100 and 1200; a blowing unit 1300; at least one ceiling exhaust unit 1400; at least one floor exhaust unit 1500; a beaten zone exhaust unit 1600; a suction driving unit 1700; and a purification unit 1800.

In detail, as illustrated in FIGS. 1 and 2, the ventilation facility 1000 according to the present disclosure includes the plurality of ceiling air supply units 1100 and 1200 installed in a plural number on the ceiling of the indoor live ammunition shooting range and configured to supply outside air to the indoor live ammunition shooting range; the blowing unit 1300 for supplying outside air to the ceiling air supply units 1100 and 1200; the at least one ceiling exhaust unit 1400 installed on the ceiling of the indoor live ammunition shooting range and configured to exhaust air in the indoor live ammunition shooting range; the at least one floor exhaust unit 1500 installed on the floor of the indoor live ammunition shooting range and configured to exhaust air in the indoor live ammunition shooting range; the beaten zone exhaust unit 1600 installed in the bullet head recovery facility 4000 and configured to exhaust air in a beaten zone; the suction driving unit 1700 configured to drive the ceiling exhaust unit 1400, the floor exhaust unit 1500 and the beaten zone exhaust unit 1600 to suck air; and the purification unit 1800 configured to filter and discharge to the outside exhaust air exhausted from the ceiling exhaust unit 1400 and the floor exhaust unit 1500 by the suction driving unit 1700.

The ceiling air supply units 1100 and 1200 supply air to prevent an influence from being exerted on a shooter due to barrel exhaust gas generated from a firearm (a gun) upon shooting according to the shooting of a live ammunition, and is configured to supply air for smooth circulation and exhaust of indoor air, by being associated with the ceiling exhaust unit 1400, the floor exhaust unit 1500 and the beaten zone exhaust unit 1600 to be described below in detail.

In detail, the ceiling air supply units 1100 and 1200 include an air supply unit for a shooter (a first ceiling air supply unit) 1100, which is provided on a ceiling behind a shooting position (a shooting lane) of the indoor live ammunition shooting range to supply air from the rear to the front of a shooter (a user's head), and a central air supply unit 1200, which is provided on the ceiling between a shooting position and a target position of the indoor live ammunition shooting range to supply air downward in an indoor space.

The air supply unit for a shooter (the first ceiling air supply unit) 1100 allows air to be supplied from the rear of the shooter to the front so that inhalation, by the shooter, of barrel exhaust gas containing a harmful substance which is generated at a time point when a bullet is fired from a firearm (a gun) upon shooting is prevented or minimized.

In detail, the air supply unit for a shooter (the first ceiling air supply unit) 1100 includes an air supply duct (a first air supply duct) 1110 which is installed in the width direction of the ceiling of the indoor live ammunition shooting range, and an air supply outlet (a first air supply outlet) 1120 which is disposed to be spaced apart from the air supply duct 1110 and is installed on the ceiling so that air supply is directed from the rear to the front of the shooter (the user's head).

The air supply duct 1110 may be configured below the ceiling surface (the indoor side) or inside the ceiling surface (over the ceiling surface) of the indoor live ammunition shooting range. The air supply duct 1110 is connected to a common air supply duct of the blowing unit 1300 to be described below.

The opening of the air supply outlet 1120 may be completely opened, but may be configured to be covered with a mesh net in order to prevent the introduction of a foreign substance generated in the indoor live ammunition shooting range.

Airflow supplied and moved by the air supply unit for a shooter (the first ceiling air supply unit) 1100 is sucked into a barrel gas exhaust unit as the floor exhaust unit 1500 to be described below to be discharged to the outside, so that it is possible to more reliably prevent the shooter from inhaling the barrel exhaust gas generated from the firearm (the gun) upon shooting.

One or more central air supply units 1200 may be provided on the ceiling between a shooting position and a target position in the indoor live ammunition shooting range.

The central air supply unit 1200 is configured by an air supply duct (a second air supply duct) 1210, which is provided in the width direction on the ceiling between a shooting position and a target position of the indoor live ammunition shooting range, and an air supply outlet (a second air supply outlet) 1220, which is disposed to be spaced apart from the air supply duct 1210.

It is preferred that a plurality of air supply ducts 1210 are installed in a direction perpendicular to the width direction, that is, in a shooting direction (two air supply ducts 1210 are installed in the drawing).

The air supply duct 1210 is connected to the common air supply duct of the blowing unit 1300 to be described below.

The opening of the air supply outlet 1220 may be installed to face directly downward the floor of the indoor live ammunition shooting range or may be configured to face a target position by being slightly inclined.

It is preferred that two air supply ducts 1210 are provided. In this case, it is preferred that the air supply outlet 1220 of one air supply duct 1210 (the air supply outlet 1220 on a side close to a shooting position) is installed to face directly downward the floor of the indoor live ammunition shooting range and the air supply outlet 1220 of the other air supply duct 1210 (the air supply outlet 1220 on a side close to a target position) is configured to face the target position by being slightly inclined.

Such oriented disposition of a plurality of air supply outlets 1220 is associated with the ceiling exhaust unit 1400 and the floor exhaust unit 1500, which will be described below, to minimize heavy metal-containing gas through smooth exhaust of indoor air in the indoor live ammunition shooting range.

The opening of each air supply outlet 1220 may be completely opened, but may be configured to be covered with a mesh net in order to prevent the introduction of a foreign substance generated in the indoor live ammunition shooting range.

Next, the blowing unit 1300 is configured to supply outside air to the ceiling air supply units 1100 and 1200, that is, the air supply unit for a shooter 1100 and the central air supply unit 1200.

In detail, the blowing unit 1300 includes an outside air supply duct 1310, an air supply fan (or a blower fan) 1320 which is provided at an end of the outside air supply duct 1310 to suck and blow outside air, and filtering means which is provided on an upstream or downstream side of the air supply fan 1320 to filter a foreign substance contained in incoming air. The filtering means may be selectively configured.

The outside air supply duct 1310 may be configured as a common connection duct which is branched and connected to the air supply ducts 1110 and 1210 of the respective ceiling air supply units 1100 and 1200, and may be configured as individual connection ducts which are separately connected to the air supply ducts 1110 and 1210 of the respective ceiling air supply units 1100 and 1200.

The drawing illustrates a case where the outside air supply duct 1310 is configured as a common connection duct. As will be described below, in the case where the ventilation facility 1000 is configured to further include a gas sensor module, the outside air supply duct 1310 is preferably configured as individual connection ducts, which will be described below.

The blowing unit 1300 may further include, as a component which assists the air supply fan 1320, a sub air supply fan provided in an outside air supply duct (an individual air supply duct) connected to a corresponding air supply unit to assist air supply therefrom.

The ceiling exhaust unit 1400 is to suck, from the ceiling, gas floating while containing a harmful substance generated by shooting of a live ammunition in the space between a shooting position and a target position.

In detail, the ceiling exhaust unit 1400 includes a ceiling exhaust unit for a shooter (a first ceiling exhaust unit) 1410 which is configured on the ceiling in front of a shooting position and a ceiling exhaust unit for a target (a second ceiling exhaust unit) 1420 which is configured on the ceiling at a position where a target is positioned or a position where a bullet head recovery unit is positioned, and is characterized in that the ceiling exhaust unit for a shooter 1410 and the ceiling exhaust unit for a target 1420 are configured with the central air supply unit 1200 interposed therebetween.

The ceiling exhaust unit for a shooter (the first ceiling exhaust unit) 1410 includes at least one suction duct (a first suction duct) 1411 which is installed in the width direction on the ceiling in front of a shooting position, and suction inlets (first suction inlets) 1412 which are provided at intervals in the suction duct 1411.

It is preferred that a plurality of suction ducts (first suction ducts) 1411 are configured. The plurality of suction ducts (first suction ducts) 1411 are configured to be connected to a main suction duct (a common suction duct or individual suction ducts) of the suction driving unit 1700 to be described below.

The suction inlets 1412 may be configured such that the openings thereof are opened directly downward, but may be configured such that the openings thereof are covered with a nonwoven fabric or a mesh net or are opened sideward to be prevented from being clogged by a foreign substance or the like.

The ceiling exhaust unit for a target (the second ceiling exhaust unit) 1420 is to suck and exhaust air containing a harmful substance generated as the bullet head of a fired ammunition hits a target or the beaten zone of the bullet head recovery facility 4000 installed at the rear of the target.

In detail, the ceiling exhaust unit for a target 1420 includes at least one suction duct (a second suction duct) 1421 which is installed in the width direction on the ceiling at a target position, and suction inlets (second suction inlets) 1422 which are provided at intervals in the suction duct 1421.

It is preferred that one or more suction ducts (second suction ducts) 1421 are configured. The one or more suction ducts (second suction ducts) 1421 are configured to be connected to the main suction duct (the common suction duct or the individual suction ducts) of the suction driving unit 1700 to be described below.

The suction inlets 1422 may be configured such that the openings thereof are opened directly downward or toward a target, but may be configured such that the openings thereof are covered with a nonwoven fabric or a mesh net or are opened sideward to be prevented from being clogged by a foreign substance or the like.

The floor exhaust unit 1500 is configured to be installed on the floor of the indoor live ammunition shooting range to exhaust air in the indoor live ammunition shooting range. Gas containing a harmful substance generated by live ammunition shooting generally sinks downward due to its weight. In this consideration, the floor exhaust unit 1500 is to suck air convecting on the floor in front of a shooting position of the indoor live ammunition shooting range, from a side surface adjacent to the floor.

In detail, the floor exhaust unit 1500 is configured to include floor suction inlets 1510, which are installed on one side surface, preferably, both side surfaces, adjacent to the floor in a space in front of a shooting position of the indoor live ammunition shooting range, and floor suction ducts (not illustrated), which communicate with the floor suction inlets 1510.

The floor suction inlets 1510 may be covered with a nonwoven fabric or a mesh net to prevent a foreign substance from being introduced.

The floor suction ducts (not illustrated) are configured to be connected to the main suction duct (the common suction duct or the individual suction ducts) of the suction driving unit 1700 to be described below.

The position of the floor exhaust unit 1500 is preferably configured as a position corresponding to the ceiling exhaust unit for a shooter 1410 of the ceiling exhaust unit 1400, that is, a position directly below the ceiling exhaust unit for a shooter 1410.

The beaten zone exhaust unit 1600 is configured to be installed on the side of the bullet head recovery facility 4000 to exhaust air from a beaten zone. The beaten zone exhaust unit 1600 is to suck and exhaust air containing a harmful substance generated at the beaten zone.

In detail, the beaten zone exhaust unit 1600 includes a beaten zone side surface suction duct 1610 which is installed on the side walls of the shooting range in front of the beaten zone of the bullet head recovery facility 4000, and suction inlets (not illustrated) which are provided at intervals in the beaten zone side surface suction duct 1610.

At least one beaten zone suction duct 1610 may be configured. The at least one beaten zone suction duct 1610 may be configured to be connected to the main suction duct (the common suction duct or the individual suction ducts) of the suction driving unit 1700 to be described below, or may be configured to be joined at the upper end thereof to the suction duct (the second suction duct) 1421 of the ceiling exhaust unit for a target 1420.

The suction driving unit 1700 is configured to suck air from the ceiling exhaust unit 1400 and the floor exhaust unit 1500.

The suction driving unit 1700 includes a main suction duct 1710 which is connected to the ceiling exhaust unit 1400 and the floor exhaust unit 1500, and a suction fan 1720 which is installed on the distal end path of the main suction duct 1710 and is driven to suck and exhaust air.

The main suction duct 1710 may be configured as a common suction duct which is branched and connected to the ceiling exhaust unit 1400 and the floor exhaust unit 1500, and may be configured as individual suction ducts which are separately connected to the ceiling exhaust unit 1400 and the floor exhaust unit 1500, respectively.

The suction driving unit 1700 may further include a sub suction fan which, in assistance to the suction fan 1720, is provided in a suction duct (an individual suction duct) connected to a corresponding exhaust unit to suck air therefrom.

The purification unit 1800 is configured to filter and discharge to the outside the exhaust air exhausted from the ceiling exhaust unit 1400, the floor exhaust unit 1500 and the beaten zone exhaust unit 1600 by the suction driving unit 1700.

In detail, the purification unit 1800 may be configured by a wet scrubber which is installed on the distal end of the exhaust line (suction duct) of the suction fan 1720 to purify and exhaust to the outside air polluted with gunpowder components and dust generated by ammunition shooting in the indoor live ammunition shooting range.

Water used as a scrubbing water is introduced into the purification unit 1800 as a scrubber. Since water discharged from the scrubber contains pollutants such as gunpowder components and dust, the purification unit 1800 may be configured to purity wastewater by a water treatment device and drain purified water into a sewer pipe.

On the other hand, the ventilation facility 1000 may further include a barrel exhaust gas floor suction unit installed on the floor directly below the front of a shooting position in the indoor live ammunition shooting range; a target floor suction unit installed on the floor directly below a target position or a bullet head recovery unit or directly below the front of the target position or the bullet head recovery unit; and an intermediate floor suction unit installed on the floor between a shooting position and the target position.

These suction units may be connected to the main suction duct in a branched manner or to the individual suction ducts, and a common suction fan or separate suction fans and/or assistant suction fans may be configured to suck indoor air therefrom.

The intermediate floor suction unit may be configured to be embedded in a state in which the upper part thereof is exposed on the surface of the floor, or may be configured to be provided in the body of a block.

The intermediate floor suction unit may be installed in various shapes according to the specification of the indoor live ammunition shooting range and a shooting method. For example, as a suction duct, a plurality of pipelines may be installed over the entire surface of the floor by being connected to each other, and may be locally installed over a plurality of positions of the floor. Such an intermediate floor suction unit may substantially effectively suck air containing a harmful substance which is generated, specifically, during mobile shooting (or shooting training).

The ventilation facility 1000 may further include a plurality of fire detectors each of which is configured at a predetermined position of the indoor live ammunition shooting range to detect polluted gas and transmit a detection signal to the control facility 5000. The control facility 5000 is implemented to control the air supply fan 1320, the sub air supply fan, the suction fan 1720 and the sub suction fan entirely or selectively according to a concentration detected on the basis of the detection signal detected in the fire detector and by varying a rotation load (a rotation RPM).

Next, the targeting device facility 2000 which is installed in the indoor live ammunition shooting range and is configured to provide a shooting target will be described.

Target Device Facility 2000

A first embodiment of the target device facility 2000 generally includes, as illustrated in FIGS. 3 to 8, a screen-type target device 2100; a projector 2200; a target detection device; a shot count device; and a target image control device (not illustrated).

In detail, as illustrated in FIGS. 3 to 8, the targeting device facility 2000 according to the first embodiment includes the screen-type target device 2100 which is configured at a position separated by a predetermined distance from a shooting lane (a shooting position) on the ceiling of the indoor live ammunition shooting range; the projector 2200 which is configured in front of the screen-type target device 2100 and projects a predetermined target image according to a control signal of a target device facility control module of the control facility 5000 so that the predetermined target image is displayed on a roll screen member 2142 of the screen-type target device 2100; the target detection device (not illustrated) which detects a point of impact on the screen-type target device 2100 to detect whether a target is hit and at the same time detect the degree of spoilage of the screen-type target device 2100 due to shooting; the shot count device (not illustrated) which is provided at the rear of the screen-type target device 2100 to count the number of shots; and a target image position change device (not illustrated) which is configured to control the position of the target image displayed on the screen-type target device 2100 on the basis of a detection signal detected by the target detection device. According to the present disclosure, the target detection device, the shot count device and the target image position change device may be configured to be selectively added.

The screen-type target device 2100 generally includes a mounting case 2110, a roll screen accommodation case 2120, folding-unfolding driving means 2130 and roll screen means 2140, and may further include mounting case posture driving means 2150.

In detail, the screen-type target device 2100 according to the first embodiment includes, as illustrated in FIGS. 3 to 8, the mounting case 2110 which is provided on the ceiling of the indoor live ammunition shooting range; the roll screen accommodation case 2120 which is provided below the mounting case 2110; the folding-unfolding driving means 2130 which is configured between the mounting case 2110 and the roll screen accommodation case 2120 to adjust the length of the roll screen accommodation case 2120 with respect to the mounting case 2110; and the roll screen means 2140 which is configured to be drawn in and out of the roll screen accommodation case 2120. The roll screen accommodation case 2120 is formed to have a predetermined length in the width direction (i.e., the direction perpendicular to the shooting direction) of the indoor live ammunition shooting range.

The mounting case 2110 is formed to have a size corresponding to the lengthwise size of the roll screen accommodation case 2120. That is to say, the mounting case 2110 is formed in the shape of a rectangular housing which is long in a length direction.

Some components of the folding-unfolding driving means 2130 to be described below are provided to be accommodated in the mounting case 2110.

The mounting case 2110 may be formed with an extended cover case 2111 which extends downward by a predetermined length from both lower sides of the mounting case 2110 to prevent an X-shaped foldable link member 2131 constituting the folding-unfolding driving means 2130 to be described below and/or the roll screen accommodation case 2120 from being exposed to the outside in a state in which the X-shaped foldable link member 2131 is folded.

The extended cover case 2111 may be configured to cover only the X-shaped foldable link member 2131 as illustrated by the solid line in FIG. 5, or may be configured to cover the X-shaped foldable link member 2131 and the roll screen accommodation case 2120 as illustrated by the dotted line in FIG. 5.

Similarly to the mounting case 2110, the roll screen accommodation case 2120 is formed in the shape of a rectangular housing which is long in a length direction.

The roll screen member 2142 of the roll screen means 2140 to be described below is provided in the roll screen accommodation case 2120 to be capable of being drawn in and out.

The roll screen accommodation case 2120 is extended downward and is length-adjusted to an original position again, by the folding-unfolding driving means 2130 interposed between the roll screen accommodation case 2120 and the mounting case 2110.

The folding-unfolding driving means 2130 may be configured to include the X-shaped foldable link member 2131 which is formed by connecting a plurality of X-shaped links 2131*a* whose intersecting centers and ends are hinged and in which both ends of the uppermost X-shaped link 2131*a* are hingedly coupled to the mounting case 2110 and both ends of the lowermost X-shaped link 2131*a* are hingedly coupled to the roll screen accommodation case 2120; a driving motor (not illustrated) which is provided in the mounting case 2110 to rotate; a pulley member which is provided on the rotation shaft of the driving motor; a driving control circuit module (not illustrated) which is provided in the mounting case 2110 and controls the driving motor to rotate by a control signal from the control facility 5000; and a length adjustment wire 2132 whose one end is fixed to the pulley member and the other end is fixed to the roll screen accommodation case 2120. When the rotation shaft of the driving motor is configured to be extended to wind and unwind the length adjustment wire 2132, the pulley member may be omitted.

The X-shaped foldable link member 2131 is configured such that both ends of the plurality of X-shaped links 2131*a* which have unit centers 2131*b* are continuously connected in a zigzag pattern and each unit center 2131*b* of the X-shaped link 2131*a* is hinged.

The X-shaped foldable link member 2131 may be multiply folded and unfolded as the unit centers 2131*b* are moved up and down by winding and unwinding of the length adjustment wire 2132 through rotation driving by the forward and reverse rotation of the driving motor.

In other words, as the length adjustment wire 2132 connected to the roll screen accommodation case 2120 or the lowermost unit center 2131*b* is wound or unwound by the driving motor, the X-shaped foldable link member 2131 lifts the lowermost unit center 2131*b* or lowers the lowermost unit center 2131*b* by a weight according to the load of the roll screen accommodation case 2120. Accordingly, as the distance between the unit centers 2131*b* is changed, the X-shaped foldable link member 2131 executes a folding movement in which a length (the length or height of an entire shape) in a vertical direction is adjusted.

Instead that the other end of the length adjustment wire 2132 is fixed to the roll screen accommodation case 2120, the length adjustment wire 2132 may be connected to the unit center 2131*b* of the lowermost X-shaped link 2131*a* for smoother and more efficient folding, which is preferable than being fixed to the roll screen accommodation case 2120.

The roll screen means 2140 is configured such that the roll screen member 2142 accommodated in the roll screen accommodation case 2120 may be drawn in and out. The roll screen means 2140 includes a roll screen rotation shaft 2141 which is provided in the roll screen accommodation case 2120 to be capable of being rotated in forward and reverse directions; the roll screen member 2142 which is provided on the roll screen rotation shaft 2141 to be able to be unwound and wound; a pulley member 2143 which is provided on one end or both ends of the roll screen rotation shaft 2141; a driving motor 2144 which is provided on the other side of the roll screen accommodation case 2120 to be capable of forward and reverse rotations; a driving belt 2145 which transfers the rotational driving force of the drive motor 2144 to the pulley member 2143, and a driving control circuit module 2146 which is provided in the roll screen accommodation case 2120 and controls the driving motor 2144 to rotate by a control signal of the control facility 5000.

The pulley member 2143 and the driving belt 2145 may be replaced with another driving force transfer means (e.g., a gear train, etc.) capable of transferring the rotational driving force of the driving motor 2144 to the roll screen rotation shaft 2141.

The lower end of the roll screen member 2142 is provided with a weight bar 2147 for stably maintaining the unfolded state of the roll screen member 2142 and minimizing shaking of the roll screen member 2142 due to live ammunition shooting.

In the screen-type target device 2100, in order to more stably maintain the unfolded state of the roll screen member 2142, the weight bar 2147 may be made of a magnetic material such as a metal, and may further include a projection 2148 (see FIG. 3) which is provided on the floor of the indoor live ammunition shooting range and a magnet body which is provided on one side surface (preferably, the rear surface, that is, a surface opposite to the shooting direction) of the projection 2148.

The projection 2148 may be formed as a U-shaped block capable of accommodating the weight bar 2147, and the magnet body may be provided on any one side surface, both side surfaces or a bottom surface in the U-shaped block.

In this configuration, when the weight bar 2147 is adjacent to the projection 2148 in a state in which the roll screen member 2142 is drawn out and is thus deployed, the weight bar 2147 is attached to the projection 2148 by the magnetic force of the magnet body. By executing live ammunition shooting in this state, the unfolded state of the roll screen member 2142 may be stably maintained, and shaking of the roll screen member 2142 due to live ammunition shooting may be minimized.

The projector 2200 displays various targets, i.e., targets such as a single static/dynamic body shape or a plurality of static/dynamic body shapes and a plurality of static/dynamic tanks or airplanes, on the screen-type target device 2100 through the target device facility control module of the control facility 5000 to be described below in detail. Furthermore, a target (a target image) is also controlled in its size by the control facility 5000 to be displayed on the screen-type target device 2100.

Lighting means 2210 is additionally configured on one side of the projector 2200.

The target detection device detects whether a target displayed on the roll screen member 2142 of the screen-type target device 2100 by the projector 2200 is hit, detects the degree of spoilage of the screen-type target device 2100 due to passage of a bullet head, and transmits a detection result to the target device facility control module of the control facility 5000. The target device facility control module of the control facility 5000 analyzes the detection result, and causes screen movement (upward and downward movement) and/or target image movement to be executed through the target image position change device.

In detail, the target detection device may be implemented by a camera image sensor (for example, a CCD camera sensor) which is provided on the ceiling surface of a corresponding shooting lane to capture a target image displayed on the roll screen member 2142 of the screen-type target device 2100.

For example, the target detection device may be implemented by photographing means including a complementary metal oxide semiconductor (CMOS) image sensor or a charge coupled device (CCD) image sensor as a device which senses the intensity and color of an optical image and converts the optical image into digital image data.

The target detection device converts a captured target image into digital image data and transmits the digital image data to the target device facility control module of the control facility 5000.

The target detection device is configured integrally with the projector 2200, and the case where the projector 2200 and the target detection device are integrally configured is illustrated.

The shot count device may be implemented to be provided at the rear of the screen-type target device 2100 and count the number of shots by counting the number of bullet heads passed through the screen-type target device 2100.

In detail, the shot count device as an analog-type count device according to an embodiment may be configured to include a rotation plate of a predetermined size which can be rotated at the rear of the screen-type target device 2100 for each shooting lane, and a rotation detection module which can detect whether the rotation plate is rotated, count the number of shots by detecting the number of rotations and at the same time additionally detect whether a hit is made, according to whether the rotation plate is rotated.

For example, the rotation detection module may be configured to detect a rotation through an encoder and a decoder which are provided on the rotation shaft of the rotation plate, count the number of rotations and transmit the counted number of rotations to the control facility 5000 through a wired/wireless communication module. Alternatively, the rotation detection module may be configured to detect, as an optical sensor module is configured on a side where the rotation plate is positioned, whether the rotation plate is rotated, count the number of rotations and transmit the counted number of rotations to the control facility 5000 through a wired/wireless communication module.

Alternatively, the shot count device may be implemented by an optical sensor module which is configured at the rear of the screen-type target device 2100 to detect a bullet head passed through the screen-type target device 2100, for example, an area sensor module.

The target image position change device is configured to drive the projector 2200 in at least one direction among up, down, left and right directions by a control command of the control facility 5000 to change the position of a target displayed on the roll screen member 2142 of the screen-type target device 2100.

The target image position change device is not specifically limited as long as it is a device capable of driving the projector 2200 in up, down, left and right directions using at least one driving motor and a gear train.

The target device facility 2000 according to the first embodiment may further include the mounting case posture driving means 2150 which rotatably drives the mounting case 2110 so that the length direction of the mounting case 2110 is parallel to the shooting direction (see FIG. 3).

As illustrated in FIG. 3, the mounting case posture driving means 2150 includes a mounting frame 2151 which has one end (an upper end) fixed to the ceiling of the indoor live ammunition shooting range and the other end (a lower end) to which the mounting case 2110 is rotatably coupled; a rotation driving member 2152 which is configured between the other end of the mounting frame 2151 and the mounting case 2110 to relatively rotate the mounting case 2110 with respect to the mounting frame 2151; and a driving control circuit module (not illustrated) which is configured in the mounting frame 2151 or the mounting case 2110 and controls the rotation driving member 2152 to be rotatably driven by a control signal of the control facility 5000.

The rotation driving member 2152 may be configured by a bevel gear or a rack gear which is configured between the other end of the mounting frame 2151 and the mounting case 2110, but is not limited thereto.

The driving control circuit module may receive a control signal from a remote location in a wired or wireless manner. When the driving control circuit module is connected through wireless communication to be controlled by a remote controller, the driving control circuit module is configured to include a wireless communicator.

The target device facility 2000 according to the first embodiment may further include target distance adjustment means which is configured to adjust the distance of a target from a shooting position by linearly moving the mounting case 2110 or the mounting frame 2151 (when the mounting frame 2151 is configured) in the shooting direction.

In an embodiment, the target distance adjustment means may be configured to include a rail frame which is disposed in the shooting direction, a movement frame which is provided with a rolling roller moved along the rail frame and is configured on the upper end of the mounting case 2110, and a motor driving module which is provided on the movement frame and includes a driving motor and a driving control circuit module for driving the rolling roller back and forth according to a control signal of the control facility 5000.

The driving control circuit module may receive a remote control signal of the control facility 5000 in a wired or wireless manner. When the driving control circuit module is connected through wireless communication to be controlled by a remote controller, the driving control circuit module is configured to include a wireless communicator.

When the target distance adjustment means is further included as described above, the projector 2200 is configured to be coupled to the mounting case 2110 or the mounting frame 2151 through a fixing frame (a fixing member). Accordingly, the projector 2200 is moved together with the screen-type target device 2100.

In addition, a shielding plate capable of protecting the projector 2200 is also fixed to one side of the projector 2200 by a fixing frame (a fixing member).

The target device facility 2000 according to a second embodiment will be described below in detail with reference to FIGS. 9 to 11.

As illustrated in FIGS. 9 to 11, the target device facility 2000 according to the second embodiment is configured by a rail movement-type multi-target device 2300. The rail movement-type multi-target device 2300 is configured to include a linear rail frame 2310 which is installed on the ceiling surface of the shooting range in the shooting direction; a movement frame 2320 which is provided with a rolling roller 2324 moved along the rail frame 2310; a driving module 2330 which is provided on the movement frame 2320 and moves the rolling roller 2324 back and forth according to a control signal of the target device facility control module of the control facility 5000; a target module 2340 which is provided below the movement frame 2320 and is configured to form a plurality of targets; and a tension support module 2350 which is configured in the driving module 2330 to ensure the stable travel of the driving module 2330 and stably maintain the vertical state of the target module 2340 when a bullet head hits a target.

The rail frame 2310 is configured to include a vertical frame part 2311 which has an upper end fixed to the ceiling surface, and a beam-type rail frame part 2312 which is formed to extend from one side of the lower end of the vertical frame part 2311 and has contact surfaces on the upper and lower surfaces thereof.

The fact that the rail frame 2310 is configured by the vertical frame part 2311 and the beam-type rail frame part 2312 as described above, specifically, the fact that the upper and lower surfaces of the beam-type rail frame part 2312 are configured to be exposed, is to be associated with the tension support module 2350 to be described below.

On the rear end surface of the rail frame 2310, there is additionally provided a buffer damper (not illustrated) for absorbing shock of the movement frame 2320 at the rear end of the rail frame 2310 when the movement frame 2320 to be described below is moved to a rearmost position along the rail frame 2310.

In addition, on the front end surface of the rail frame 2310, there is configured a front end charge terminal constituting a battery charge module to be described below.

The movement frame 2320 is configured to include a body frame part 2321 which is formed in a predetermined shape and in which a driving module is installed; a roller mounting frame part 2323 which is connected to the lower portion of the body frame part 2321 by a connection frame part 2322; and a plurality of rolling rollers 2324 which are rotatably coupled to the roller mounting frame part 2323.

The driving module 2330 is configured to drive the rolling rollers 2324 back and forth according to a wired or wireless control signal, preferably, a wireless communication control signal, of the target device facility control module of a remote location constituting the control facility 5000. The driving module 2330 is configured to include a driving motor 2331 which is provided in the body frame part 2321 and is capable of forward and reverse rotations; a receiver 2332 which is provided in the body frame part 2321 to receive a wireless control signal of the control facility 5000; a control box 2333 which receives the signal received by the receiver 2332 to control the operation of the driving motor 2331; a battery 2334 which is configured in the body frame part 2321 and is provided to supply power to the driving motor 2331, the receiver 2332 and the control box 2333; and power transfer means for transferring the rotational driving of the driving motor 2331 to the rolling rollers 2324.

In the present disclosure, the battery 2334 is configured by a rechargeable battery.

The power transfer means may be configured in a pulley type power transfer scheme or a gear train type power transfer scheme, but is not limited thereto.

Although the drawing illustrates a case where the power transfer means is configured in the pulley type power transfer scheme, the power transfer means may be configured in the gear train type power transfer scheme of a bevel gear.

In an embodiment, the target module 2340 is configured to include an extended frame part 2341 which is formed to extend downward from the lower end of one side surface (i.e., a surface facing a shooting lane) of the movement frame 2320; a transverse frame part 2342 which is coupled to the lower end of the extended frame part 2341 in a horizontal direction; a plurality of target-coupling frame parts 2343 which are provided at regular intervals on the transverse frame part 2342; a bulletproof plate 2344 which is provided on the front surface of the extended frame part 2341; a bullet head buffer plate 2345 which is obliquely provided on the front surface of the bulletproof plate 2344 to protect the extended frame part 2341; a target plate 2346 which has an upper end fixed to each target-coupling frame part 2343;

and coupling means 2347 which replaceably couples the target-coupling frame part 2343 and the target plate 2346.

The transverse frame part 2342 is formed to have a length that allows target plates 2346 provided thereunder configure targets for a plurality of shooting lanes. In the drawings, a case where the transverse frame part 2342 is configured to form targets for three shooting lanes is illustrated.

The bulletproof plate 2344 and the bullet head buffer plate 2345 may be made of a rubber plate of a predetermined thickness (e.g., 50 T), and may be configured as a known bulletproof material such as bulletproof fiber or ceramic is coated on or included in an iron plate or a rubber plate.

The target plate 2346 may be made of a rubber plate of a predetermined thickness (e.g., 6 T).

In another embodiment, the target module 2340 is configured to include an extended frame part which is formed to extend downward from the lower end of one side surface (i.e., a surface facing a shooting lane) of the movement frame 2320; a transverse frame part which is coupled to the lower end of the extended frame part in a horizontal direction; a screen member which is provided to be coupled at the upper end thereof to the transverse frame part; at least one projector which is coupled and fixed to the movement frame 2320 and projects a predetermined target image according to a control signal of the target device facility control module of the control facility 5000 so that the predetermined target image is displayed on the screen member; a bulletproof plate or a bullet head buffer plate whose one side is fixed and coupled to the movement frame 2320 through a connection frame and which is provided in front of the projector (on a shooting lane side); coupling means which replaceably couples the transverse frame part and the screen member; and a target detection module which is configured integrally with the projector, detects a point of impact on the screen member to detect whether a target is hit and at the same time detects the degree of spoilage of the screen member due to shooting.

The transverse frame part is formed to have a length capable of configuring targets for a plurality of shooting lanes on the screen member provided thereunder.

The screen member is made of a fabric material, and is configured so that a weight bar is provided at the lower end thereof.

The projector may be configured by a plurality of projectors to display target images for shooting lanes, respectively, and these projectors may be implemented to operate independently of each other by the control facility 5000.

The target detection module may be implemented by a camera image sensor (for example, a CCD camera sensor) which is provided on the ceiling surface of a corresponding shooting lane to capture a target image displayed on the screen member.

For example, the target detection module may be implemented by photographing means including a complementary metal oxide semiconductor (CMOS) image sensor or a charge coupled device (CCD) image sensor as a device which senses the intensity and color of an optical image and converts the optical image into digital image data.

The target detection module converts a captured target image into digital image data and transmits the digital image data to the control facility 5000.

In the target module 2340 according to another embodiment configured as mentioned above, the movement frame 2320 is moved back and forth along the rail frame 2310, and various target images projected from the projector are displayed on the screen member.

The tension support module 2350 is configured to ensure the stable travel of the driving module 2330 and stably maintain the vertical state of the target module 2340 when a bullet head hits a target. The tension support module 2350 is configured to include at least one pair of tension rods 2351 whose one ends are rotatably coupled to one side of the movement frame 2320 (in detail, one side of the roller mounting frame part 2323) and the other ends extend downwardly of the rail frame 2310; and contact rollers 2352 which are rotatably coupled to the other ends of the tension rods 2351 and are brought into contact with and supported by the lower surface of the beam-type rail frame part 2312.

The tension support module 2350 may further include a connection damper member 2353 which connects in a stretchable manner the other ends of the tension rods 2351 to each other.

The target device facility 2000 of the second embodiment may further include a charge module 2360 which is configured to charge the battery 2334 of the driving module 2330.

The charge module 2360 is configured to include battery charge terminals 2361 which are provided on both sides of the movement frame 2320 (e.g., both sides of the roller mounting frame part 2323), and power connection terminals for charge (not illustrated) as front end charge terminals which are provided on both sides of the front end of the rail frame 2310 to be connected to a power supply source.

The target device facility 2000 of the second embodiment may further include a manual control panel which is provided on one side of the body frame part 2321 to manually operate the driving motor 2331 of the driving module 2330.

Bulletproof Facility 3000

The bulletproof facility 3000 is installed to protect components exposed to a bullet head among components constituting the ventilation facility 1000 and the target device facility 2000 and to protect the wall surface of the indoor shooting range.

In detail, as the bulletproof facility 3000, a shielding plate 3100 may be additionally configured on the front side of each of the first air supply outlet 1120, the second air supply outlet 1220, the first suction inlet 1412 and the second suction inlet 1422 to prevent each of the air supply outlets and the suction inlets from being damaged by an incorrectly fired bullet head.

A bullet head buffer plate made of a rubber plate or a compressed rubber plate of a predetermined thickness is provided on the front surface of the shielding plate 3100.

It is preferred that the bullet head buffer plate is formed to contain a flame retardant element (a flame retardant material) such as boron, chlorine, bromine and phosphorus. Preferably, the bullet head buffer plate may be formed to have a thickness of 50 mm or more by compressing rubber powder made of particles of 0.5 mm or more.

The bulletproof facility 3000 may further include a ricochet receiver which is installed at each of a plurality of places on the ceiling of the shooting range to prevent a bullet ricochet. A bullet head buffer plate having the same configuration as the above-described bullet head buffer plate may be provided on one surface or both surfaces of the ricochet receiver to more reliably prevent a bullet ricochet and the spoilage of a bullet head and secure the safety of a shooter.

The bulletproof facility 3000 may further include a shielding plate which is provided in front of a projector (in the direction of a shooting lane) to protect the projector from a bullet head.

In addition, the bulletproof facility 3000 is implemented such that a bullet head buffer plate of the same configuration as the above-described bullet head buffer plate is configured on the wall surface of the live ammunition shooting range.

Bullet Head Recovery Facility 4000

The bullet head recovery facility 4000 is installed on a side opposite to a shooting position (or a side behind the target of the targeting device facility 2000) and is configured to recover a bullet head. As illustrated in FIGS. 12 to 14, the bullet head recovery facility 4000 includes a housing 4100 which is formed in a parallelogram shape when viewed from the side and is open in the upper and front surfaces thereof; a partition plate 4200 which partitions the inner space of the housing 4100 into a plurality of lattice spaces; a vertical frame 4310 which is vertically provided at the front end of the upper surface of the housing 4100; a top plate 4320 which is provided on the front surface of the vertical frame 4310; support frames 4400 which are provided on the rear surface of the housing 4100 to support the housing 4100; a top cover 4500 which openably covers the upper surface opening of the housing 4100; a bullet head buffer plate 4600 which covers the top plate 4320 and the front surface opening of the housing 4100; and a rubber particle filler which is filled in the lattice spaces of the housing 4100.

The housing 4100 is formed in a parallelogram shape when viewed from the side, and is configured to be inclined rearward from the bottom to the top when viewed from the front.

In the partition plate 4200, a transverse partition plate 4210 which is installed in the horizontal direction of the housing 4100 is provided to be laterally detachable from the housing 4100 to one side. As the transverse partition plate 4210 is detachably provided in this way, the rubber particle filler may be filled or recovered through the upper surface opening in a state in which the bullet head recovery facility 4000 is assembled.

A bullet head buffer bulletproof frame 4220 may be additionally configured on the front surface of the partition plate 4200. The bullet head buffer bulletproof frame 4220 may be configured as a known bulletproof material such as bulletproof fiber or ceramic is coated on an iron plate, or may be configured by a conventional bulletproof iron plate.

The bullet head buffer plate 4600 may be made of a rubber plate or a compressed rubber plate of a predetermined thickness. It is preferred that the bullet head buffer plate 4600 is formed to contain a flame retardant element (a flame retardant material) such as boron, chlorine, bromine and phosphorus.

The bullet head buffer plate 4600 may be provided with nonwoven fabric on a plane (over an entire area) entirely of or partially internally of the rubber plate. The nonwoven fabric may be formed in a corrugated form, and a plurality of corrugated nonwoven fabrics may be provided at intervals. Instead of the nonwoven fabric, one bulletproof material selected from the group consisting of Inima, Kevlar, graphene, carbon nanotubes, ceramics and aramid or a wire mesh may be planarly provided entirely of or partially internally of the rubber plate.

Since such a bullet head buffer plate 4600 may have a flame retardant function while having buffering and bulletproof properties, it is possible to prevent fire from occurring by frictional heat or other causes of fire according to the impact of an incorrectly fired bullet head and to prevent a bullet head from being ricocheted to the outside, thereby preventing an accident from occurring by a bullet ricochet.

The rubber particle fill filled in the lattice spaces of the housing 4100 may be formed of a rubber particle fill having a predetermined particle diameter (e.g., 10 mm or less, preferably 2 to 6 mm).

The bullet head recovery facility 4000 may further include a spray line 4700 which is configured over the housing 4100 to be connected to an external water supply line and is provided with a nozzle part for jetting supply water; and a fire detector 4800 which is provided in any one of the lattice spaces of the housing 4100.

Control Facility 5000

The control facility 5000 is installed in the indoor shooting range, and is configured to control the ventilation facility 1000, the target device facility 2000 and the bullet head recovery facility 4000. As illustrated in FIGS. 15 to 19, the control facility 5000 includes a ventilation control module 5100 which is configured to control the ventilation facility 1000; a target device facility control module 5200 which is configured to control the target device facility 2000; and a bullet head recovery facility control module 5300 which is configured to control the bullet head recovery facility 4000.

As illustrated in FIG. 16, the ventilation control module 5100 includes a ventilation on/off operation switch 5110; a suction and exhaust manual operation switch 5120 which is defined at one side of the indoor live ammunition shooting range and is configured to manually operate and control the blower fan (the air supply fan) 1320 of the blowing unit 1300 and the suction fan 1720 of the suction driving unit 1700; and a detection-based controller 5130 which is implemented to control the air supply fan 1320, the sub air supply fan, the suction fan 1720 and the sub suction fan entirely or selectively according to a concentration detected on the basis of a detection signal generated in the fire detector and by varying a rotation load (rotation RPM).

When the target device facility 2000 is configured according to the first embodiment, as illustrated in FIG. 17, the target device facility control module 5200 includes a target image display controller 5210 which is implemented to select the type of a target image irradiated through the projector 2200 and control the size of the target image; a wire adjustment controller 5220 which transfers a control signal to the driving control circuit module of the folding-unfolding driving means 2130 to control the folding and unfolding of the X-shaped foldable link member 2131; and a screen driving controller 5230 which transfers a control signal to the driving control circuit module of the roll screen means 2140 to control the drawing-in and drawing-out of the roll screen member 2142. The target device facility control module 5200 may be configured to selectively include a mounting case posture controller 5240 which transfers a control signal to the driving control circuit module of the mounting case posture driving means 2150 to control the posture of the mounting case 2110; a target distance controller 5250 which transfers a control signal to the driving control circuit module of the target distance adjustment means to control the distance of a target; a spot image extractor and determiner 5260 which is implemented to extract a spot image (a bullet mark) by receiving a target image detected by the target detection device and make a determination by comparing an extracted bullet mark image and a corresponding target image; a target image controller 5270 which is implemented to control the target image control device on the basis of a determination result of the spot image extractor and determiner 5260; a shot counter 5280 which counts the number of shots by receiving a signal detected by the shot count device; and a notification controller 5290 which notifies whether to start and stop shooting, visually and/or audibly through visual means (e.g., an LED) and/or audible means (e.g., a soundproof headset) installed for each shooting lane.

The target image display controller 5210 displays a target image, selected by a user's selection or an administrator's selection, on the screen-type target device 2100 through the projector 2200.

The wire adjustment controller 5220 adjusts the height of the roll screen accommodation case 2120, and the screen driving controller 5230 controls the unfolding and folding of the roll screen member 2142. The mounting case posture controller 5240 prevents or minimizes damage to the mounting case 2110 and the roll screen accommodation case 2120 by minimizing an exposure area in a shooting direction after shooting is completed or when shooting is executed in another shooting lane, and the target distance controller 5250 is capable of arbitrarily adjusting a distance to a target.

The spot image extractor and determiner 5260 is implemented to extract a bullet mark image, compare the extracted bullet mark image with the image of an original corresponding target image, and when the extracted bullet mark image goes out of a preset comparison range (that is, a mismatch range according to the spoilage of the screen member by a bullet head), transfer a control signal for controlling a target image to the target image controller 5270.

Since the spot image extractor and determiner 5260 uses a known image data processing program which processes and converts image data, detailed description thereof will be omitted.

The target image controller 5270 is implemented to control the projector 2200 to be moved in at least one direction among up, down, left and right directions so that the position of a target image displayed on the screen member is changed.

Accordingly, the present disclosure enables a clear target image to be displayed on the screen-type target device 2100, and may maximally utilize the roll screen member 2142 of the screen-type target device 2100 which is spoiled according to live ammunition shooting.

When the target device facility 2000 is configured according to the second embodiment, as illustrated in FIG. 18, the target device facility control module 5200 may be configured to include a wireless communicator 5310 which is configured to wirelessly communicate with the receiver 2332 of the driving module 2330; a driving motor controller 5320 which controls the forward and reverse rotation driving of the driving motor 2331; distance sensors 5330 which are installed at regular intervals on the rail frame 2310 to detect a movement distance of the movement frame 2320; a setting distance controller 5340 which controls, through the driving motor controller 5320 on the basis of a detection signal of the distance sensors 5330, the movement frame 2320 to be moved to a preset setting distance; and a charge mode controller 5350 which controls the driving module 2330 to charge the battery 2334 so that the movement frame 2320 is moved to the front end of the rail frame 2310.

The target device facility control module 5200 may further include a wired communicator 5311 which communicates with the control box 2333 of the driving module 2330 instead of the wireless communicator 5310 or separately from the wireless communicator 5310.

When the target module 2340 in the target device facility 2000 according to the second embodiment is configured by a target module according to another embodiment, the target device facility control module 5200 is configured to include components of the target device facility control module 5200 according to the first embodiment, that is, a target image display controller, a spot image extractor and determiner and a notification controller.

The bullet head recovery facility control module 5300 includes a fire detection signal receiver 5410 which receives a fire detection signal from the fire detector 4800; and a fire water controller 5420 which controls, when it is determined on the basis of a signal received from the fire detection signal receiver 5410 that a fire has occurred, fire water to be supplied through the spray line 4700.

As is apparent from the above description, by the eco-friendly smart indoor live ammunition shooting range facility system according to the present disclosure, advantages are provided in that a harmful substance containing a heavy metal, such as lead (lead fume) and copper, generated in a live ammunition shooting range due to the use of a live ammunition may be efficiently and reliably discharged in conformity with the environment according to the live ammunition shooting range and that an influence exerted by the harmful substance containing the heavy metal may be minimized and an original bullet head or a bullet head close to the original bullet head may be easily recovered, thereby ensuring recycling and preventing environmental pollution In addition, by the present disclosure, advantages are provided in that it is possible to prevent a harmful substance containing a heavy metal from spreading into air not only on a target side where a bullet head is hit and on a shooting lane side where a shooter is positioned but also throughout the inside of a shooting range, thereby preventing adverse influences from being exerted on the health of the shooter or a manager and that it is possible to create comfortable shooting range environment, thereby increasing the efficiency of a shooting training.

Furthermore, by the present disclosure, advantages are provided in that a target does not need to be replaced every time after shooting and can be used for a long time, thereby improving shooting operability and preventing the occurrence of an accident and that a target object such as a long-distance target, a short-distance target and a target type may be easily changed and a training situation for night shooting may be easily created.

The embodiments described herein and the accompanying drawings are merely illustrative of some of the technical ideas included in the present disclosure. Therefore, since the embodiments disclosed herein are intended not to limit but to explain the technical spirit of the present disclosure, it is obvious that the scope of the technical spirit of the present disclosure is not limited by these embodiments. Modifications and specific embodiments that can be easily inferred by those skilled in the art within the scope of the technical idea included in the specification and drawings of the present disclosure should be construed as being included in the scope of the present disclosure.

The invention claimed is:

1. An indoor live ammunition shooting range facility system comprising:
   a ventilation facility installed in an indoor live ammunition shooting range, and configured to ventilate air of the indoor live ammunition shooting range;
   a targeting device facility installed in the indoor live ammunition shooting range, and configured to provide a shooting target;
   a bulletproof facility installed to protect components exposed to an inside of the indoor live ammunition shooting range among components configuring the ventilation facility and the target device facility and to protect a wall surface of the indoor live ammunition shooting range;
   a bullet head recovery facility installed on a side opposite to a shooting position, and configured to recover a bullet head; and
   a control facility installed in the indoor live ammunition shooting range, and configured to control the ventilation facility, the target device facility and the bullet head recovery facility,
   wherein the ventilation facility comprises:
   a plurality of ceiling air supply units installed in a plural number on a ceiling of the indoor live ammunition shooting range, and configured to supply outside air to the indoor live ammunition shooting range;
   a blowing unit for supplying outside air to the ceiling air supply units;
   at least one ceiling exhaust unit installed on the ceiling of the indoor live ammunition shooting range, and configured to exhaust air in the indoor live ammunition shooting range;
   at least one floor exhaust unit installed on a floor of the indoor live ammunition shooting range, and configured to exhaust air in the indoor live ammunition shooting range;
   a beaten zone exhaust unit installed in the bullet head recovery facility, and configured to exhaust air in a beaten zone;
   a suction driving unit configured to drive the ceiling exhaust unit, the floor exhaust unit and the beaten zone exhaust unit to suck air; and
   a purification unit configured to filter and discharge to the outside exhaust air exhausted from the ceiling exhaust unit and the floor exhaust unit by the suction driving unit.

2. The indoor live ammunition shooting range facility system according to claim 1, wherein
   the ceiling air supply units include a first ceiling air supply unit which is provided on a ceiling behind a shooting position of the indoor live ammunition shooting range to supply air from a rear to a front of a shooter, and a second ceiling air supply unit which is provided on the ceiling between a shooting position and a target position of the indoor live ammunition shooting range to supply external air downward in an indoor space, the first ceiling air supply unit includes a first air supply duct which is installed in a width direction of the ceiling, and a first air supply outlet which is disposed to be spaced apart from the first air supply duct and is installed to supply air in a direction in which air is supplied from the rear to the front of the shooter, the second ceiling air supply unit includes at least two second air supply ducts which are provided in the width direction on the ceiling between a shooting position and a target position of the indoor live ammunition shooting range, and second air supply outlets which are disposed to be spaced apart from the second air supply ducts, respectively, and the second air supply outlet provided in the second air supply duct on a side positioned close to the shooting position is installed to face directly downward a floor of the indoor live ammunition shooting range, and the second air supply outlet provided in the second air supply duct on a side positioned close to the target position is installed to face the target position by being slightly inclined.

3. The indoor live ammunition shooting range facility system according to claim 2, wherein the blowing unit includes an outside air supply duct which is connected to the first air supply duct and the second air supply ducts, an air supply fan which is provided at an end of the outside air supply duct to suck and blow outside air, and filtering means which is provided on an upstream or downstream side of the air supply fan to filter a foreign substance contained in incoming air, the ventilation facility further comprises fire detectors which are provided at a plurality of positions of the indoor live ammunition shooting range to detect quality of indoor air and transmit a detection signal to the control facility, the outside air supply duct is implemented by individual air supply ducts which are connected to the first air supply duct and the second air supply duct, respectively, in a branched manner, sub air supply fans which are controlled by the control facility are provided in the individual air supply ducts, and the suction driving unit includes a main suction duct which is connected to the ceiling exhaust unit and the floor exhaust unit, and a suction fan which is installed on one end of the main suction duct and is driven to suck and exhaust indoor air.

4. The indoor live ammunition shooting range facility system according to claim 3, wherein the ceiling exhaust unit includes a first ceiling exhaust unit which is configured on the ceiling in front of a shooting position, and a second ceiling exhaust unit which is configured on the ceiling at a position where a target is positioned, the first and second ceiling exhaust units are configured with the second air supply unit interposed therebetween, each of the first ceiling exhaust unit and the second ceiling exhaust unit includes at least one suction duct which is installed in the width direction on the ceiling, and suction inlets which are provided at intervals in the suction duct, the floor exhaust unit includes floor suction inlets which are installed on one side surface or both side surfaces adjacent to the floor in a space in front of a shooting position, and floor suction ducts which communicate with the floor suction inlets, the beaten zone exhaust unit includes a beaten zone side surface suction duct which is installed on side walls of the indoor live ammunition shooting range in front of a beaten zone of the bullet head recovery facility, and suction inlets which are provided at intervals in the beaten zone side surface suction duct, and at least one beaten zone side surface suction duct is provided, and is configured to be connected to the main suction duct of the suction driving unit or is configured to be joined at an upper end thereof to the suction duct of the second ceiling exhaust unit.

5. The indoor live ammunition shooting range facility system according to claim 4, wherein the main suction duct is implemented as individual suction ducts which are connected to the ceiling exhaust unit and the floor exhaust unit in a branched manner, sub suction fans which are controlled by the control facility are provided in the individual suction ducts, and the ventilation facility further comprises a barrel exhaust gas floor suction unit which is installed on the floor directly below a front of a shooting position; a target floor suction unit which is installed on the floor directly below a target position or directly below a front of the target position; and an intermediate floor suction unit which is installed on the floor between the shooting position and the target position.

6. The indoor live ammunition shooting range facility system according to claim 3, wherein the targeting device facility includes a screen-type target device which is configured on the ceiling of the indoor live ammunition shooting range; a projector which is configured in front of the screen-type target device and projects a target image according to a control signal of a system control module so that the target image is displayed on a roll screen member of the screen-type target device; and a target detection device which detects a point of impact on the screen-type target device to detect whether a target is hit and at the same time detect degree of spoilage of the screen-type target device due to shooting, the screen-type target device includes a mounting case which is provided on the ceiling of the indoor live ammunition shooting range; a roll screen accommodation case which is provided below the mounting case; extension-contraction driving means which is configured between the mounting case and the roll screen accommodation case to adjust a length of the roll screen accommodation case with respect to the mounting case; roll screen means which is configured to draw in and out the roll screen member accommodated in the roll screen accommodation case; mounting case posture driving means which rotatably drives the mounting case so that a length direction of the mounting case is parallel to a shooting direction; and target distance adjustment means which is configured to adjust a distance of a target from a shooting position by linearly moving the mounting case in the shooting direction, the roll screen accommodation case is formed to have a predetermined length in a width direction of the indoor live ammunition shooting range, the mounting case posture driving means includes a mounting frame which has one end fixed to the ceiling and the other end to which the mounting case is rotatably coupled; a rotation driving member which is configured between the other end of the mounting frame and the mounting case to relatively rotate the mounting case with respect to the mounting frame; and a driving control circuit module which is configured in the mounting frame or the mounting case and controls the rotation driving member to be rotatably driven by a control signal of the control facility, the target distance adjustment means includes a rail frame which is disposed in the shooting direction on a ceiling surface; a movement frame which is provided with a rolling roller moved along the rail frame and is configured on an upper end of the mounting frame; and a motor driving module which is provided on the movement frame and includes a driving motor and a driving control circuit module for driving the rolling roller back and forth according to a control signal of the control facility, the target device facility further includes a target image control device which is configured to control a position of a target image displayed on the screen-type target device on the basis of a detection signal detected by the target detection device, the target detection device includes a camera image sensor which is configured to capture a target image displayed on the roll screen member of the screen-type target device, and the target image control device is configured to drive the projector in at least one direction among up, down, left and right directions by a control signal of the system control module.

7. The indoor live ammunition shooting range facility system according to claim 3, wherein the target device facility includes a linear rail frame which is installed on the ceiling surface of the indoor live ammunition shooting range in a shooting direction; a movement frame which is provided with a rolling roller moved along the rail frame; a driving module which is provided on the movement frame and moves the rolling roller back and forth according to a control signal inputted thereto; a target module which is provided below the movement frame and is configured to form a plurality of targets; and a tension support module which is configured between the rail frame and the movement frame to support the movement frame, the rail frame includes a vertical frame part which has an upper end fixed to the ceiling surface, and a beam-type rail frame part which is formed to extend from one side of a lower end of the vertical frame part and has contact surfaces on upper and lower surfaces thereof, a bulletproof plate is provided on an exposed surface of the rail frame, the movement frame includes a body frame part; a roller mounting frame part which is connected to a lower portion of the body frame part by a connection frame part; and a plurality of rolling rollers which are rotatably coupled to the roller mounting frame part, the tension support module includes at least one pair of tension rods whose one ends are rotatably coupled to one side of the movement frame and the other ends extend downwardly of the rail frame; contact rollers which are rotatably coupled to the other ends of the tension rods and are brought into contact with and supported by the lower surface of the beam-type rail frame part; and a connection damper member which connects in a stretchable manner the other ends of the tension rods to each other, the target device facility further includes a buffer damper which is provided on a rear end surface of the rail frame to absorb shock of the movement frame when the movement frame is moved to a rearmost position, the driving module includes a driving motor which is provided in the movement frame and is capable of forward and reverse rotations; a receiver which is provided in the body frame part to receive a wireless control signal inputted thereto; a control box which receives the signal received by the receiver to control an operation of the driving motor; a rechargeable battery which is configured in the body frame part and is provided to supply necessary power to the driving motor, the receiver and the control box; power transfer means for transferring rotational driving of the driving motor to the rolling rollers; and a charge module which is configured to charge the rechargeable battery, the charge module includes battery charge terminals which are provided on both sides of the movement frame, and power connection terminals for charge which are provided on both sides of a front end of the rail frame to be connected to a power supply source, and the target module includes an extended frame part which is provided on a lower end of one side surface of the movement frame; a transverse frame part which is coupled to a lower end of the extended frame part in a direction perpendicular to the extended frame part; a plurality of target-coupling frame parts which are provided at regular intervals on the transverse frame part; a bulletproof plate which is provided on a front surface of the extended frame part; a target plate which has an upper end fixed to each target-coupling frame part; and coupling means which replaceably couples the target plate.

8. The indoor live ammunition shooting range facility system according to claim 6, wherein the bullet head recovery facility includes a housing which is formed in a parallelogram shape when viewed from a side and is open in upper and front surfaces thereof; a partition plate which partitions an inner space of the housing into a plurality of lattice spaces; a vertical frame which is vertically provided at a front end of the upper surface of the housing; a top plate which is provided on a front surface of the vertical frame; support frames which are provided at a rear of the housing to support the housing; a top cover which openably covers an upper surface opening of the housing; a bullet head buffer plate which covers the top plate and a front surface opening of the housing; a rubber particle filler which is filled in the lattice spaces of the housing; a spray line which is configured over the housing to be connected to an external water supply line and is provided with a nozzle part for jetting supply water; and a fire detector which is provided in any one of the lattice spaces of the housing, a bullet head buffer bulletproof frame which is made as bulletproof fiber or ceramic is coated on an iron plate or is made of a bulletproof iron plate is configured on a front surface of the partition plate, and the bullet head buffer plate is made of a rubber plate or a compressed rubber plate of a predetermined thickness, which contains a flame retardant material such as at least one of boron, chlorine, bromine and phosphorus, and is provided with one bulletproof material selected from the group consisting of Inima, Kevlar, graphene, carbon nanotubes, ceramics and aramid, nonwoven fabric or a wire mesh on a plane entirely of or partially internally of the rubber plate.

9. The indoor live ammunition shooting range facility system according to claim 8, wherein the control facility comprises:
 a ventilation control module configured to control the ventilation facility;
 a target device facility control module configured to control the target device facility; and
 a bullet head recovery facility control module configured to control the bullet head recovery facility.

10. The indoor live ammunition shooting range facility system according to claim 9, wherein
 the ventilation control module includes a ventilation on/off operation switch; a suction and exhaust manual operation switch which is defined at one side of the indoor live ammunition shooting range and is configured to manually operate and control a blower fan of the blowing unit and the suction fan of the suction driving unit; and a detection-based controller which is implemented to control the air supply fan, the sub air supply fans, the suction fan and the sub suction fans entirely or selectively on the basis of a detection signal detected by the fire detector,
 the target device facility control module includes a target image display controller which is implemented to select a type of a target image irradiated through the projector and control a size of the target image; a wire adjustment controller which transfers a control signal to a driving control circuit module of the extension-contraction driving means to control folding and unfolding of an X-shaped foldable link member; a screen driving controller which transfers a control signal to a driving control circuit module of the roll screen means to control drawing-in and drawing-out of the roll screen member; a mounting case posture controller which transfers a control signal to a driving control circuit module of the mounting case posture driving means to control a posture of the mounting case; a target distance controller which transfers a control signal to a driving control circuit module of the target distance adjustment means to control a distance of a target; a spot image extractor and determiner which is implemented to extract a spot image by receiving a target image detected by the target detection device and make a determination by comparing an extracted bullet mark image and a corresponding target image; a target image controller which is implemented to control the target image control device on the basis of a determination result of the spot image extractor and determiner; a shot counter which counts the number of shots by receiving a signal detected by a shot count device; and a notification controller which notifies whether to start and stop shooting, visually and/or audibly through at least one of visual means and audible means installed for each shooting lane, and
 the bullet head recovery facility control module includes a fire detection signal receiver which receives a fire detection signal from the fire detector; and a fire water controller which controls, when it is determined on the basis of a signal received from the fire detection signal receiver that a fire has occurred, fire water to be supplied through the spray line.

11. The indoor live ammunition shooting range facility system according to claim 9, wherein
 the ventilation control module includes a ventilation on/off operation switch; a suction and exhaust manual operation switch which is defined at one side of the indoor live ammunition shooting range and is configured to manually operate and control a blower fan of the blowing unit and the suction fan of the suction driving unit; and a detection-based controller which is implemented to control the air supply fan, the sub air supply fans, the suction fan and the sub suction fans entirely or selectively on the basis of a detection signal detected by the fire detector,
 the target device facility control module includes a wireless communicator which is configured to wirelessly communicate with the receiver of the driving module; a driving motor controller which controls forward and reverse rotation driving of the driving motor; distance sensors which are installed at regular intervals on the rail frame to detect a movement distance of the movement frame; a setting distance controller which controls, through the driving motor controller on the basis of a detection signal of the distance sensors, the movement frame to be moved to a preset setting distance; and a charge mode controller which controls the driving module to charge the battery so that the movement frame is moved to a front end of the rail frame, and
 the bullet head recovery facility control module includes a fire detection signal receiver which receives a fire detection signal from the fire detector; and a fire water controller which controls, when it is determined on the basis of a signal received from the fire detection signal receiver that a fire has occurred, fire water to be supplied through the spray line.

12. The indoor live ammunition shooting range facility system according to claim 9, wherein
 the bulletproof facility includes a shielding plate which is provided on a front side of each of the first air supply outlet, the second air supply outlet, a first suction inlet and a second suction inlet, a bullet head buffer plate which is provided on a front surface of the shielding plate and an inner surface of the indoor live ammunition shooting range and is made of a compressed rubber plate, and a shielding plate which is provided on a front side of the projector to protect the projector from a bullet head, and
 the bullet head buffer plate is formed to contain a flame retardant element such as at least one of boron, chlorine, bromine and phosphorus.

13. The indoor live ammunition shooting range facility system according to claim 7, wherein
 the bullet head recovery facility includes a housing which is formed in a parallelogram shape when viewed from a side and is open in upper and front surfaces thereof; a partition plate which partitions an inner space of the housing into a plurality of lattice spaces; a vertical frame which is vertically provided at a front end of the upper surface of the housing; a top plate which is provided on a front surface of the vertical frame; support frames which are provided at a rear of the housing to support the housing; a top cover which openably covers an upper surface opening of the housing; a bullet head buffer plate which covers the top plate and a front surface opening of the housing; a rubber particle filler which is filled in the lattice spaces of the housing; a spray line which is configured over the housing to be connected to an external water supply line and is provided with a nozzle part for jetting supply water; and a fire detector which is provided in any one of the lattice spaces of the housing,
 a bullet head buffer bulletproof frame which is made as bulletproof fiber or ceramic is coated on an iron plate or is made of a bulletproof iron plate is configured on a front surface of the partition plate, and the bullet head buffer plate is made of a rubber plate or a compressed rubber plate of a predetermined thickness, which contains a flame retardant material such as at least one of boron, chlorine, bromine and phosphorus, and is provided with one bulletproof material selected from the group consisting of Inima, Kevlar, graphene, carbon nanotubes, ceramics and aramid, nonwoven fabric or a wire mesh on a plane entirely of or partially internally of the rubber plate.

\* \* \* \* \*